(12) United States Patent
Kimura et al.

(10) Patent No.: US 11,244,496 B2
(45) Date of Patent: Feb. 8, 2022

(54) INFORMATION PROCESSING DEVICE AND INFORMATION PROCESSING METHOD

(71) Applicant: SONY CORPORATION, Tokyo (JP)

(72) Inventors: Jun Kimura, Kanagawa (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/635,254

(22) PCT Filed: May 10, 2018

(86) PCT No.: PCT/JP2018/018103
§ 371 (c)(1),
(2) Date: Jan. 30, 2020

(87) PCT Pub. No.: WO2019/031005
PCT Pub. Date: Feb. 14, 2019

(65) Prior Publication Data
US 2021/0142552 A1    May 13, 2021

(30) Foreign Application Priority Data

Aug. 8, 2017 (JP) .............................. JP2017-152893

(51) Int. Cl.
*G06T 15/20* (2011.01)
*G06F 3/01* (2006.01)
*G06T 17/20* (2006.01)

(52) U.S. Cl.
CPC .............. *G06T 15/20* (2013.01); *G06F 3/013* (2013.01); *G06T 17/20* (2013.01); *G06T 2210/36* (2013.01); *G06T 2210/62* (2013.01)

(58) Field of Classification Search
CPC ..... G06T 15/20; G06T 17/20; G06T 2210/62; G06T 2210/36; G06F 3/013
See application file for complete search history.

(56) References Cited

U.S. PATENT DOCUMENTS

| 5,963,668 | A | 10/1999 | Horikawa et al. |
| 6,313,838 | B1 | 11/2001 | Deering |
| 6,425,826 | B1 | 7/2002 | Nakanishi et al. |
| 2015/0205132 | A1* | 7/2015 | Osterhout .......... G02B 27/0093 345/633 |
| 2017/0160550 | A1* | 6/2017 | Kobayashi .......... H04N 13/356 |

FOREIGN PATENT DOCUMENTS

| EP | 1055199 A1 | 11/2000 |
| GB | 2354417 A | 3/2001 |
| JP | 09-231401 A | 9/1997 |
| JP | 2000-296261 A | 10/2000 |

(Continued)

OTHER PUBLICATIONS

International Search Report and Written Opinion of PCT Application No. PCT/JP2018/018103, dated Jun. 19, 2018, 10 pages of ISRWO.

*Primary Examiner* — Said Broome
(74) *Attorney, Agent, or Firm* — Chip Law Group

(57) ABSTRACT

An information processing device including a control unit that senses a state that causes decrease of a display frame rate of a virtual object presented to a user and dynamically change a display detail level of the virtual object in accordance with a result of the sensing is provided.

19 Claims, 20 Drawing Sheets

(56) References Cited

FOREIGN PATENT DOCUMENTS

| | | | |
|---|---|---|---|
| JP | 2001-229402 | A | 8/2001 |
| JP | 2002-503854 | A | 2/2002 |
| JP | 2002-279449 | A | 9/2002 |
| JP | 2004-086508 | A | 3/2004 |
| JP | 2004-355131 | A | 12/2004 |
| WO | 99/041704 | A1 | 8/1999 |

* cited by examiner

FIG.8
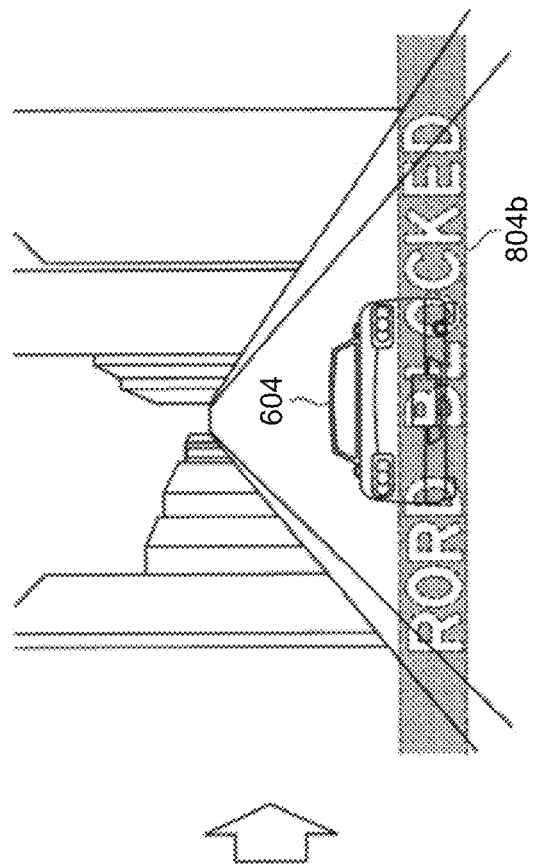
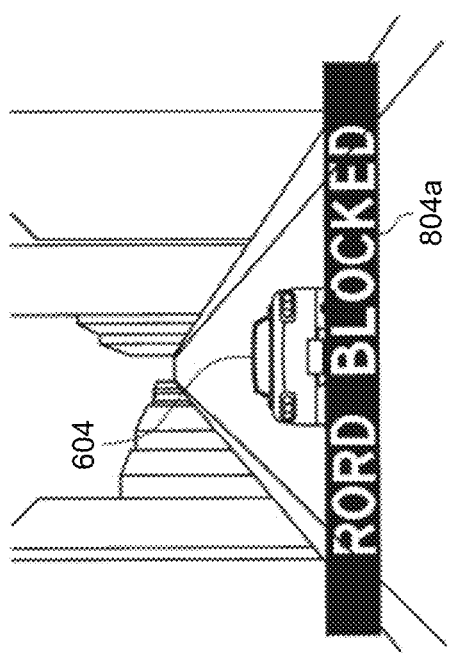

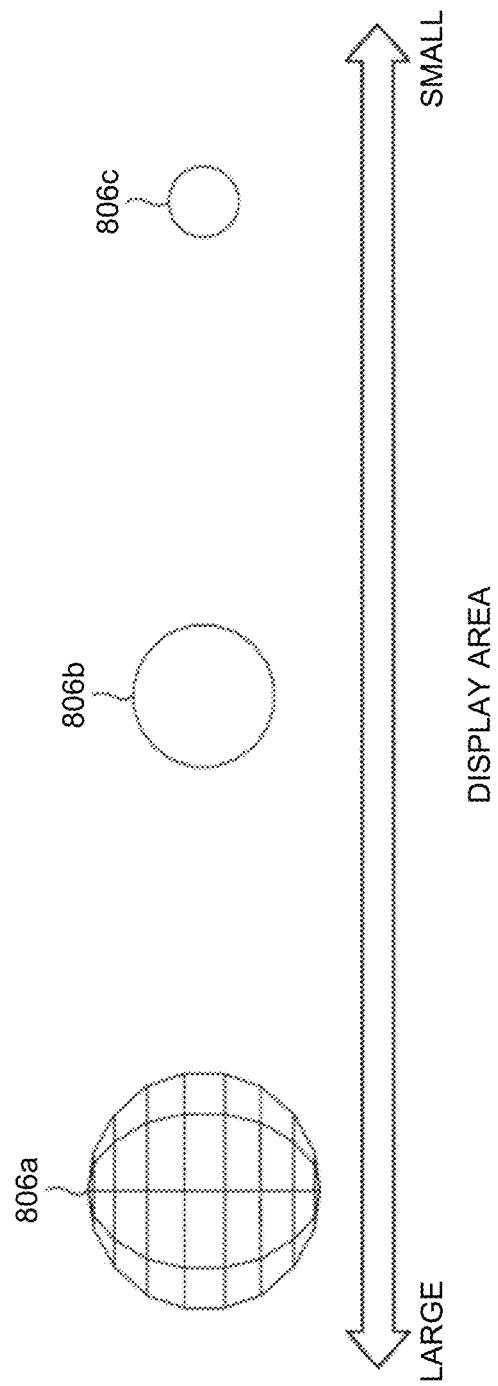

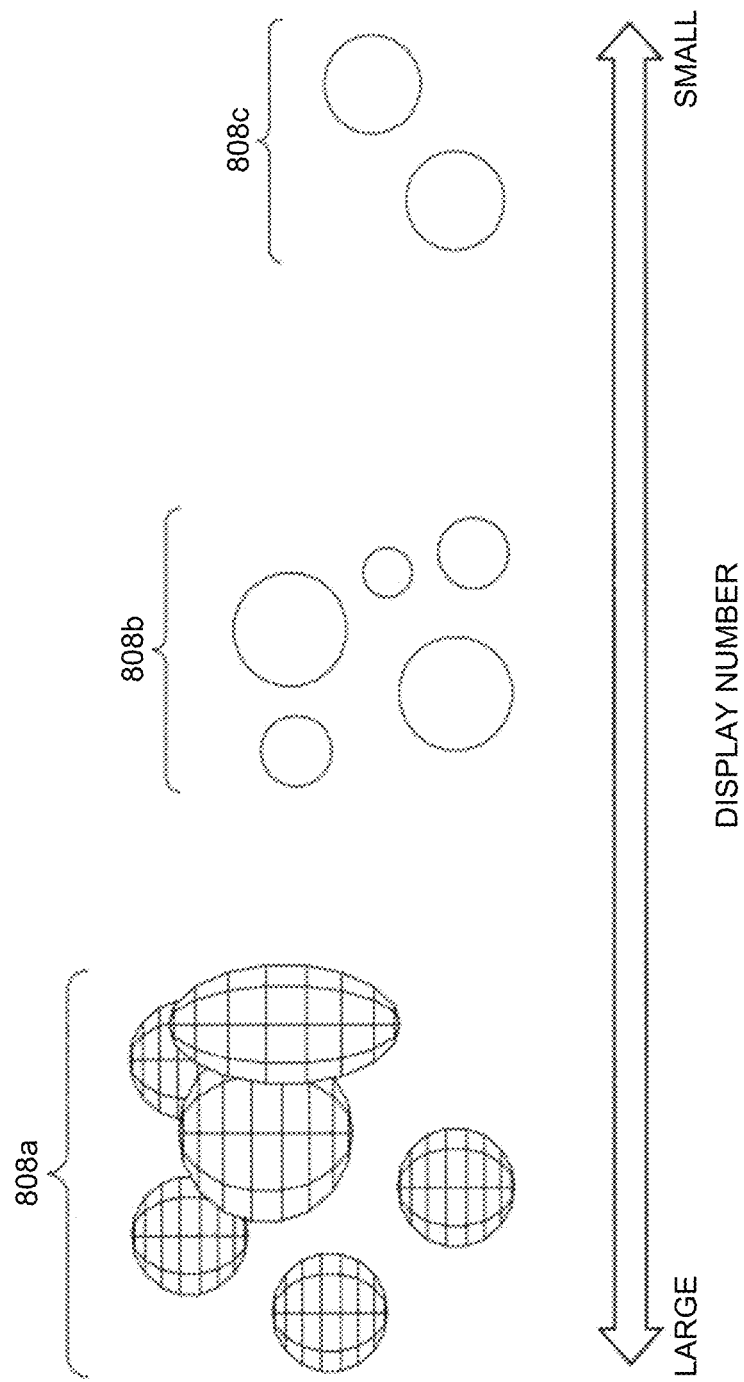

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/018103 filed on May 10, 2018, which claims priority benefit of Japanese Patent Application No. JP 2017-152893 filed in the Japan Patent Office on Aug. 8, 2017. Each of the above-referenced applications is hereby incorporated herein by reference in its entirety.

FIELD

The present disclosure relates to an information processing device, an information processing method, and a computer program.

BACKGROUND

Recently, the technology of displaying video in reality has been provided along with the development of information processing technology and display technology. Examples of such technologies include an augmented reality (AR) technology. The AR technology presents additional information to a user in a superimposing manner over the real world, and the information presented to the user by the AR technology is called annotation and is visualized as a virtual object in various forms such as text, icon, and animation.

The AR technology as described above is achieved by, for example, a head-mounted display (hereinafter referred to as "HMD") mounted on the head of the user or the like. Specifically, the HMD includes a display positioned in front of the eyes of the user when mounted on the user, and displays the above-described virtual object in front of the eyes of the user. The types of such an HMD include a non-transmissive type in which the above-described display is non-transmissive, and a transmissive type in which the above-described display is transmissive. When the display is transmissive, the above-described virtual object is displayed in real time in a superimposing manner over real space visually recognized by the user through the display. According to the AR technology, when displayed in this manner, the virtual object can be perceived as a real object existing in real space by the user. For example, an HMD including such a transmissive display is disclosed in Patent Literatures 1 and 2 below. The HMD has a compact form for mounting on the head of the user or the like.

CITATION LIST

Patent Literature

Patent Literature 1: JP 2016-208380 A
Patent Literature 2: JP 2016-157458 A

SUMMARY

Technical Problem

Typically, the capacity of a battery mounted on an information processing device is limited, and accordingly, the processing capacity of a processor or the like is limited. Thus, for example, the display frame rate of a virtual object decreases in some cases when the processing amount of display of the virtual object increases in the information processing device and the processing capacity of the processor has no allowance. The processing amount of display of the virtual object means the amount of processing performed at a central processing unit (CPU) and a graphics processing unit (GPU) when the virtual object is displayed.

Thus, the present disclosure discloses an information processing device, an information processing method, and a computer program that are novel, modified, and capable of avoiding decrease of the display frame rate of a virtual object.

Solution to Problem

According to the present disclosure, an information processing device is provided that includes a control unit configured to sense a state that causes decrease of a display frame rate of a virtual object presented to a user and dynamically change a display detail level of the virtual object in accordance with a result of the sensing.

Moreover, according to the present disclosure, an information processing method is provided that includes: sensing a state that causes decrease of a display frame rate of a virtual object presented to a user, and dynamically changing a display detail level of the virtual object in accordance with a result of the sensing.

Moreover, according to the present disclosure, a computer program is provided that configured to cause a computer to function as a control unit configured to sense a state that causes decrease of a display frame rate of a virtual object presented to a user and dynamically change a display detail level of the virtual object in accordance with a result of the sensing.

Advantageous Effects of Invention

As described above, according to the present disclosure, it is possible to provide an information processing device, an information processing method, and a computer program that are capable of avoiding decrease of the display frame rate of a virtual object.

The above-described effect is not necessarily restrictive, and any effect described in the present specification or any other effect understandable from the present specification may be achieved together with or in place of the above-described effect.

BRIEF DESCRIPTION OF DRAWINGS

FIG. 8 is an explanatory diagram (2) for describing exemplary processing according to the present embodiment.

FIG. 10 is an explanatory diagram for describing exemplary processing according to the present embodiment.

FIG. 11 is an explanatory diagram for describing exemplary processing according to a modification of the present embodiment.

DESCRIPTION OF EMBODIMENTS

Figure 1:
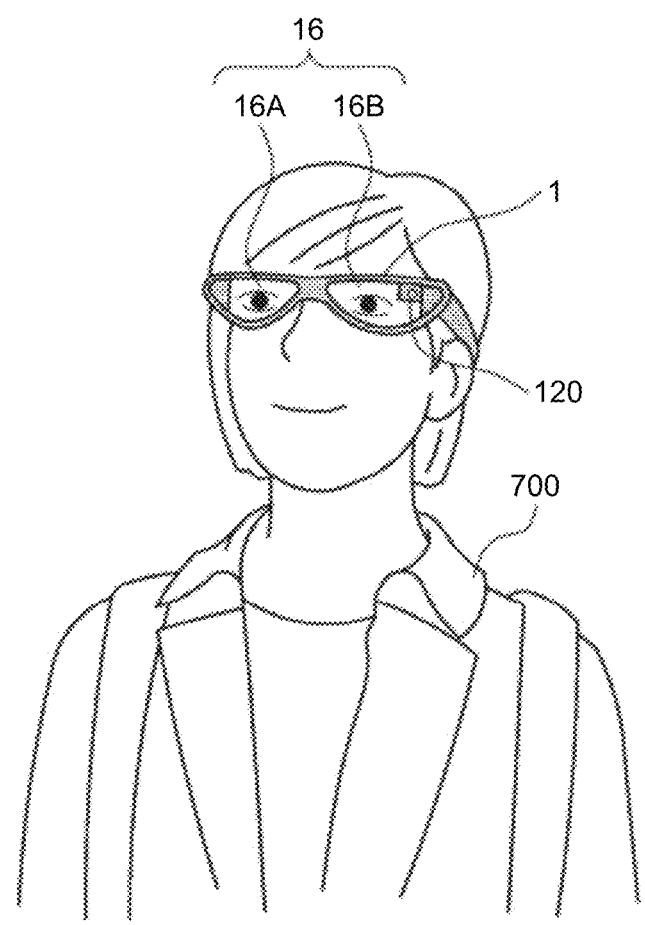
FIG. 1 is a diagram for describing an overview configuration of an information processing device 1 according to a first embodiment of the present disclosure.

Preferable embodiments of the present disclosure will be described below in detail with reference to the accompanying drawings. In the present specification and drawings, components having functional configurations identical to each other in effect are denoted by an identical reference sign, and duplicate description thereof are omitted.

In the present specification and drawings, a plurality of components having functional configurations identical to each other in effect may be distinguished by different alphabets appended to an identical reference sign. However, when not particularly needed to be distinguished from each other, a plurality of components having functional configurations identical to each other in effect are denoted by an identical reference sign only. In addition, similar components in different embodiments may be distinguished by different alphabets appended to an identical reference sign. However, when not particularly needed to be distinguished from each other, similar components are denoted by an identical reference sign only.

In the following description, "display frame rate" means the number of frames (the number of images) processed per unit time in virtual object display. In addition, "recognition frame rate" means the number of times of sampling in which predetermined information is detected per unit time in processing of recognizing the information.

Description will be made in the following order.

1. Overview configuration of information processing device according to an embodiment of the present disclosure
2. Technological background of the present disclosure
3. First embodiment 3.1. Detailed configuration of information processing device according to first embodiment 3.2. Exemplary virtual object display according to first embodiment 3.3. Information processing method according to first embodiment 4. Second embodiment 4.1. Information processing method according to second embodiment 4.2. Modification of second embodiment 5. Third embodiment 5.1. Information processing method according to third embodiment 5.2. Modification of third embodiment 6. Conclusion 7. Hardware configuration 8. Supplement

1. Overview Configuration of Information Processing Device According to Embodiment of the Present Disclosure The following first describes overview of an information processing device according to an embodiment of the present disclosure with reference to FIG. 1. FIG. 1 is a diagram for describing an overview configuration of an information processing device 1 according to the present embodiment. As illustrated in FIG. 1, the information processing device 1 according to the present embodiment is achieved by, for example, a glasses-type HMD mounted on the head of a user 700. In other words, the information processing device 1 is a wearable device mounted on the user 700. A display unit 16 corresponding to a glass lens part positioned in front of the eyes of the user 700 when mounted may be a transmissive display through which the outside of the eyeglass lens part can be visually recognized or a non-transmissive display through which the outside of the eyeglass lens part cannot be visually recognized. In the following description, an HMD including the display unit 16 as a transmissive display is referred to as "smart eye glasses".

The information processing device 1 according to the present embodiment can present a virtual object in front of the eyes of the user 700 by displaying the virtual object at the display unit 16. In the following description, the virtual object means a virtual object that can be perceived by the user 700 as a real object existing in real space. In addition, in the present embodiment, an HMD as an example of the information processing device 1 is not limited to a configuration in which the HMD displays the virtual object to both eyes of the user 700, but may have a configuration in which the HMD displays the virtual object only to one of the eyes of the user 700.

In an example in which the information processing device 1 is the smart eye glasses, the information processing device 1 mounted on the head of the user 700 as illustrated in FIG. 1 has a configuration in which a pair of a display unit 16A for the left eye and a display unit 16B for the right eye are disposed in front of the eyes of the user 700. For example, transmissive displays are used as the display units 16A and 16B, and the information processing device 1 can set each transmissive display to a see-through state, in other words, a transparent or semi-transparent state by controlling the transmissivity of the display. When the display units 16A and 16B are in the see-through state, the user 700 can perceive the surrounding real space in a case in which the information processing device 1 is usually mounted in the same way as eye glasses, and thus does not obstruct daily life of the user 700. In addition, the display units 16A and 16B in the see-through state can display an image of text, figure, or the like, in other words, can display the virtual object in a superimposing manner over real space as augmented reality (AR). Such a transmissive display includes, for example, a semi-reflective mirror and a transparent light guiding plate, holds a virtual image optical system made of a transparent light guiding unit or the like in front of the eyes of the user 700, and displays the virtual object inside the virtual image optical system.

In the present embodiment, when a non-transmissive display is used, the display unit 16 may display an image of real space captured by an outward camera 120 (to be described later in detail) provided to the information processing device 1, and simultaneously display the virtual object in a superimposing manner over the image of real space.

In addition, in the present embodiment, the display unit 16 may be achieved as, for example, a light-emitting-diode (LED) light source configured to directly project video to the retina of the user 700. In other words, the information processing device 1 may be achieved as a projective HMD.

Various kinds of contents may be displayed as the virtual object on the display unit 16. The virtual object may be, for example, a marker (such as a sign) schematically illustrating information presented to the user 700, a map, or a figure (such as a person, a telephone, or a sign) schematically illustrating a real object. In addition, the virtual object may be, for example, a moving image content such as a movie or a video clip, a still image content captured by a digital still camera or the like, or data of an electronic book or the like. Thus, anything that can be a display target can be assumed as a content displayed as the virtual object.

The information processing device 1 is provided with the outward camera 120 configured to capture an image of real space around the user 700. Specifically, the outward camera 120 is installed on the information processing device 1 to capture an image of, as an image capturing range, real space in the direction of visual recognition by the user 700 while the information processing device 1 is mounted on the user 700. When a plurality of outward cameras 120 are provided, a depth image (distance image) can be obtained from parallax information by the outward cameras 120, and thus the information processing device 1 can recognize information of the surrounding environment, for example, the shapes, positional relation, and the like of real objects existing in real space.

In addition, although not illustrated in FIG. 1, the information processing device 1 may be provided with an inward camera 122 (refer to FIG. 2) configured to capture an image of the face or the like of the user 700 when mounted. Specifically, the inward camera 122 is installed on the information processing device 1 to capture an image of, as the image capturing range, the face and both eyes of the user 700 while the information processing device 1 is mounted on the user 700. When a plurality of inward cameras 122 are provided, the information processing device 1 can accurately recognize the position of each eyeball of the user 700, the position of each pupil, the orientation and motion of each sight line, and the like from parallax information obtained by the inward cameras 122.

Although not illustrated in FIG. 1, the information processing device 1 may be provided with various sensors such as a microphone 124 (refer to FIG. 2) configured to acquire voice and the like. In addition, although not illustrated in FIG. 1, the information processing device 1 may be provided with a speaker 18 (refer to FIG. 2). For example, the speaker 18 may be achieved by a pair of earphone speakers corresponding to the right and left ears of the user 700. In this manner, the information processing device 1 may be provided with a plurality of sensors of the same kind.

Although not illustrated in FIG. 1, the information processing device 1 may be provided with a button and a switch for performing an input operation by the user 700 (exemplary operation input unit). In addition, not only the operation on a button and the like but also various input schemes such as input by voice, gesture input by a hand or the head, and input by sight line may be selected as the input operation to the information processing device 1 by the user 700. The input operation by the various input schemes may be acquired by, for example, various sensors provided to the information processing device 1.

In the present embodiment, the form of the information processing device 1 is not limited to the example illustrated in FIG. 1. For example, the information processing device 1 may be a head-band HMD or a helmet HMD (for example, a visor part of a helmet corresponds to a display). In other words, in the present embodiment, the information processing device 1 is a wearable device that can be mounted on the user 700, and the form thereof is not particularly limited as long as the information processing device 1 includes the display unit 16 positioned in front of the eyes of the user 700 when mounted. The above-described head-band HMD means a type mounted by a band extending over the entire circumference of the head of the user 700. In addition, the head-hand HMD includes a type provided with a band passing through not only sides of the head of the user 700 but also the top of the head.

As described above, the following description will be made with an example in which the information processing device 1 is an HMD including a transmissive display and called smart eye glasses.

2. Technological Background of the Present Disclosure

The overview of the information processing device 1 according to the present embodiment is described above. The following describes the technological background of the information processing device 1.

As described above, the information processing device 1 according to the present embodiment displays the virtual object in a superimposing manner over real space. Then, interaction between the user 700 and the information processing device 1 can be performed through the virtual object displayed in a superimposing manner. More specifically, the information processing device 1 can present predetermined information to the user 700 by displaying the virtual object in front of the eyes of the user 700. In addition, the user 700 can perform an operation on the information processing device 1 through an action such as touch on the virtual object.

The virtual object is displayed with preferable display form, display position, display timing, and the like to achieve real-time interaction between the user 700 and the information processing device 1 through the virtual object. When the virtual object is displayed in this manner, the user 700 can perceive the virtual object as if it is a real object existing in real space, and can intuitively understand information provided by the information processing device 1 through the virtual object. In addition, the user 700 can intuitively understand, through the virtual object, the method of interaction with the information processing device 1 and easily perform an operation on the information processing device 1 by using the virtual object.

However, in a case of non-smooth display of the virtual object such as display frame rate decrease in which the virtual object is not displayed at a preferable timing, or frame jumping, disorder or the like occurs to experience provided to the user 700 by the virtual object. As a result, it is difficult to achieve real-time interaction through the virtual object between the user 700 and the information processing device 1. In other words, the display frame rate decrease and the like need to be avoided to achieve real-time interaction between the user 700 and the information processing device 1 through the virtual object. The above-described frame jumping means a display state in which, for example, the user 700 can perceive that the virtual object is awkwardly intermittently displayed unlike a real object. The "frame jumping" is also called "frame dropping", and occurs when a frame to be displayed is not displayed but is skipped and a frame to be displayed next is displayed. In the following description, the display frame rate decrease includes the above-described frame jumping.

The information processing device 1 made of an HMD or the like as described above has a compact form for mounting on the head of the user 700. To achieve the compact form of the information processing device 1, there is a limitation on the capacitor of a battery mounted on the information processing device 1, and thus on, for example, the processing capacity of a processor or the like, and the allowable amount of heat generation due to processing as well. For example, in the information processing device 1 as described above, the display frame rate decrease occurs in some cases when the processing amount of display of the virtual object increases and the processing capacity of the information processing device 1 has no allowance. In other words, the display frame rate decrease, the frame jumping, and the like occur in some cases when the processing capacity of the information processing device 1 has no allowance. In such a case, discomfort and disorder attributable to the display frame rate decrease and the like occur in the experience provided to the user 700 by the virtual object, and thus it is difficult to achieve real-time interaction between the user 700 and the information processing device 1 through the virtual object.

The above-described display frame rate decrease can occur, in addition to the information processing device 1 as smart eye glasses including a transmissive display, in the information processing device 1 as an HMD including a non-transmissive display. For example, in such an information processing device 1, the decrease of the display frame rate of the virtual object can occur when the virtual object is displayed in a superimposing manner over an image of real space captured by the outward camera 120 while the image is displayed on the display unit 16 in real time.

Thus, based on the technological background as described above, the inventors have reached the creation of the information processing device 1 according to the embodiment of the present disclosure configured to sense a state that causes the decrease of the display frame rate of the virtual object and dynamically change a display detail level of the virtual object in accordance with a result of the sensing. Specifically, when having sensed the state that causes the decrease of the display frame rate of the virtual object, the information processing device 1 avoids the decrease of the display frame rate of the virtual object by changing the display detail level of the virtual object to ensure allowance in the processing capacity of the information processing device 1. As a result, according to the information processing device 1, it is possible to achieve real-time interaction between the user 700 and the information processing device 1 through the virtual object. In the following description, the display detail level collectively means any index indicating display fineness, such as the display resolution.

3. First Embodiment

The technological background of the present disclosure is described above. The following describes a first embodiment of the present disclosure. In the present embodiment, the information processing device 1 senses the display position of the virtual object as the processing amount of display of the virtual object, and dynamically changes, as the display detail level of the virtual object, the display resolution (index of pixel density in display) or effect processing (processing performed on display, such as shading processing) in accordance with the sensed display position.

For example, when displayed at a position far from the user 700, the virtual object is displayed in a small size like a real object existing in real space. When displayed at a position close to the user 700, the virtual object is displayed in a large size like a real object existing in real space. The amount of display processing at the information processing device 1 changes in accordance with the size of the virtual object. For example, in a case in which the virtual object having a large size is displayed, the display frame rate decrease occurs in some cases when the processing amount of display of the virtual object increases and the processing capacity of the information processing device 1 has no allowance. Thus, in the present embodiment, the state that causes the decrease of the display frame rate of the virtual object, in other words, the display position of the virtual object that can cause the decrease of the display frame rate of the virtual object is sensed. In addition, in the present embodiment, the display resolution of the virtual object is changed in accordance with the sensed display position. In other words, in the present embodiment, when the display distance of the virtual object to the user 700 is equal to a first distance, the display detail level of the virtual object is increased as compared to that of another virtual object, the display distance of which is equal to a second distance shorter than the first distance. In this manner, according to the present embodiment, allowance is ensured in the processing capacity of the information processing device 1 to avoid the decrease of the display frame rate of the virtual object.

In the following description, when the virtual object is displayed at a position extremely close to the user 700 (for example, when the distance between the user 700 and the display position of the virtual object is shorter than 0.8 m), effect processing of displaying the virtual object in a semi-transparent manner or deleting the virtual object is performed to prevent visual fatigue and "visually induced motion sickness" due to the virtual object.

Figure 2:
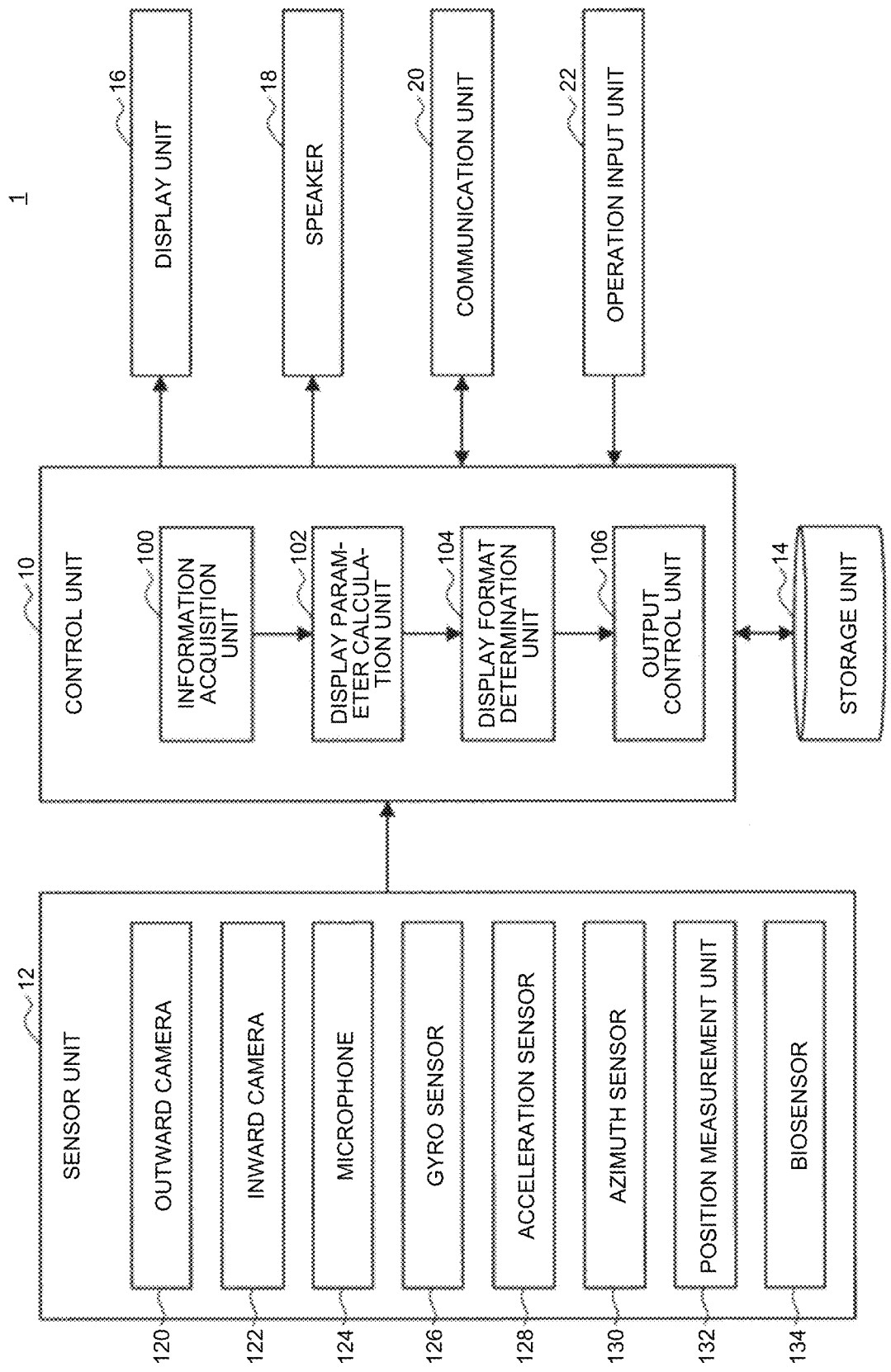
FIG. 2 is a block diagram illustrating a detailed exemplary configuration of the information processing device 1 according to the present embodiment.

3.1. Detailed Configuration of Information Processing Device According to First Embodiment The following first describes a detailed configuration of the information processing device 1 according to the present embodiment with reference to FIG. 2. FIG. 2 is a block diagram illustrating a detailed exemplary configuration of the information processing device 1 according to the present embodiment. As illustrated in FIG. 2, the information processing device 1 mainly includes a control unit 10, a sensor unit 12, a storage unit 14, the display unit 16, the speaker 18, a communication unit 20, and an operation input unit 22. Each functional component of the information processing device 1 will be described in detail below.

Control Unit 10

The control unit 10 functions as an arithmetic processing device and a control device, and controls entire operation in the information processing device 1 in accordance with various computer programs. The control unit 10 is achieved by an electronic circuit of a microprocessor such as a CPU or a GPU. The control unit 10 may include, for example, a read only memory (ROM) configured to store a computer program, a calculation parameter, and the like to be used, and a random access memory (RAM) configured to temporarily store a parameter and the like that change as appropriate. For example, the control unit 10 performs control to dynamically change the display resolution of the virtual object and the like in accordance with the display position of the virtual object and the like. Specifically, as illustrated in FIG. 2, the control unit 10 according to the present embodiment can function as an information acquisition unit 100, a display parameter calculation unit 102, a display format determination unit 104, and an output control unit 106. Each block of the control unit 10 will be described in detail below.

Information Acquisition Unit 100

The information acquisition unit 100 can acquire information related to various states of the user 700 or surroundings of the user 700 by using a sensing result sensed by the sensor unit 12 to be described later. Specifically, the information acquisition unit 100 may include, for example, a user-posture recognition engine configured to recognize the posture and state of the user 700, a depth recognition engine configured to recognize depth information in real space around the user 700, and a simultaneous localization and mapping (SLAM) recognition engine configured to identify the position of the user 700. In addition, the information acquisition unit 100 may include a sight-line recognition engine configured to sense the sight line of the user 700, a voice recognition engine configured to recognize the user 700 or environmental sound around the user 700, a position recognition engine configured to recognize the absolute position of the information processing device 1 (user 700), and the like. In addition, the information acquisition unit 100 may include a real object recognition engine configured to recognize a real object in real space, and the like. These recognition engines are merely exemplary, but the present embodiment is not limited thereto.

Specifically, the user-posture recognition engine recognizes the posture (including the orientation or tilt of the face relative to the body) of the head of the user 700 or the like by using a sensing result sensed by the sensor unit 12. For example, the user-posture recognition engine recognizes the posture of the user 700 or the like by using an image captured by the outward camera 120, gyro information acquired by a gyro sensor 126 to be described later, and the like. The user-posture recognition engine may recognize the posture of the user 700 or the like by using acceleration information acquired by an acceleration sensor 128 to be described later, azimuth information acquired by an azimuth sensor to be described later, and the like. A typically known algorithm may be used as an algorithm for recognition of the posture of the user 700 or the like, and the recognition algorithm is not particularly limited in the present embodiment.

The depth recognition engine recognizes depth information in real space around the user 700 by using a sensing result sensed by the sensor unit 12. Specifically, the depth recognition engine can recognize the distance between the sensor unit 12 and a real object in real space and shape information (depth information) such as irregularity based on a result of measurement of a return time of reflected light from the real object by using a time-of-flight (ToF) scheme. The depth recognition engine may recognize the position and shape of the real object in real space based on the difference (binocular parallax) of the real object between a plurality of images of an identical real space captured by a plurality of outward cameras 120 from different viewpoints. A typically known algorithm may be used as an algorithm for recognition of the depth information, and the recognition algorithm is not particularly limited in the present embodiment.

The SLAM recognition engine simultaneously performs estimation of the position of the information processing device (user 700) and production of a map of real space around the user 700 by using a sensing result sensed by the sensor unit 12, and identifies the position of the information processing device 1 in real space. For example, the SLAM recognition engine (in particular, visual SLAM) sequentially restores the three-dimensional shape of a captured real object based on an image captured by the outward camera 120. Then, the SLAM recognition engine associates a result of the restoring with the position and posture sensing result by the outward camera 120, thereby performing production of a map of real space around the user 700 and estimation of the position and posture of the outward camera 120 (user 700) in real space. For example, the position and posture of the outward camera 120 can be estimated as information indicating relative change based on a sensing result sensed by various sensors such as the acceleration sensor 128 provided to the sensor unit 12. A typically known algorithm may be used as an algorithm for the SLAM recognition, and the recognition algorithm is not particularly limited in the present embodiment.

The information acquisition unit 100 may recognize a detailed position of the information processing device 1 (user 700) in three-dimensional real space around the user 700 by performing space recognition (space understanding) based on both the recognition result of the depth recognition engine and the recognition result of the SLAM recognition engine described above.

The sight-line recognition engine performs sensing of the sight line of the user 700 by using a sensing result sensed by the sensor unit 12. For example, the sight-line recognition engine recognizes the direction of the sight line of the user 700 by analyzing a captured image of an eyeball of the user 700 acquired by the inward camera 122. In the present embodiment, an algorithm for the sight line sensing is not particularly limited, but for example, the direction of the sight line of the user 700 may be recognized based on the positional relation between the inner corner and the iris or the positional relation between cornea reflection and the pupil.

The voice recognition engine performs recognition of the user 700 or environmental sound around the user 700 by using a sensing result sensed by the sensor unit 12. For example, the voice recognition engine may perform noise removal, sound source separation, and the like on collected sound information acquired by the microphone 124 to be described later, and perform voice recognition, morpheme analysis, sound source recognition, noise level recognition, or the like. The voice recognition engine may extract a predetermined word from recognized voice information.

The position recognition engine recognizes the absolute position of the information processing device 1 (user 700) using a sensing result sensed by the sensor unit 12. For example, the position recognition engine can recognize the place (for example, station, school, or house) of the information processing device 1 based on position information measured by a position measurement unit 132 to be described later and map information acquired in advance.

The real object recognition engine has a function to recognize a real object based on an image captured by the outward camera 120 or the like. For example, the real object recognition engine recognizes the kind or the like of the real object by matching a feature amount of the real object, which is calculated from the image captured by the outward camera 120, with a feature amount of the real object, which is registered in advance. The above-described feature amount may be calculated by, for example, a well-known feature amount calculation technology such as a scale-invariant feature transform (SIFT) method or a random ferns method.

The information acquisition unit 100 may acquire a device profile (for example, the display processing speed, the state of sensing by the sensor unit 12, and recognition frame rates at the various recognition engines described above) indicating the state of processing at the information processing device 1. In addition, the information acquisition unit 100 may acquire the display position, display area, display number, or display form (for example, the type of a content displayed as the virtual object, or the moving speed of the virtual object displayed) of the virtual object, which is defined by an application configured to perform display of the virtual object.

Display Parameter Calculation Unit 102

The display parameter calculation unit 102 calculates, for example, an index of the processing amount of display of the virtual object. For example, the display parameter calculation unit 102 calculates the distance from the user 700 to the display position of the virtual object by using the display position of the virtual object, which is defined by the application configured to perform display of the virtual object and acquired by the information acquisition unit 100. In the present embodiment, the display parameter calculation unit 102 may calculate, for example, an index indicating the state of processing at the control unit 10 such as the display frame rate of the virtual object by using the device profile acquired by the information acquisition unit 100.

Display Format Determination Unit 104

The display format determination unit 104 sets the display detail level (for example, resolution) of the virtual object based on a result of the calculation by the display parameter calculation unit 102. In addition, the display format determination unit 104 sets display effect processing (for example, transparent processing or texture change) performed on the virtual object based on the result of the calculation by the display parameter calculation unit 102. For example, a threshold compared with the above-described calculation result when the display format determination unit 104 sets the display detail level or the like is determined based on the load of processing at the information processing device 1 and a display quality felt by the user 700, which are caused by display of the virtual object performed in a test in advance.

Output Control Unit 106

The output control unit 106 controls the display unit 16 to be described later to display the virtual object based on determination by the display format determination unit 104.

Sensor Unit 12

The sensor unit 12 has a function to acquire various kinds of information related to the user 700 or an environment (real space) surrounding the user 700. For example, as illustrated in FIG. 2, the sensor unit 12 mainly includes the outward camera 120, the inward camera 122, the microphone 124, the gyro sensor 126, the acceleration sensor 128, an azimuth sensor 130, the position measurement unit 132, and a biosensor 134. The above-described sensors are exemplary, and the present embodiment is not limited thereto. A plurality of sensors of each of the above-described various kinds of sensors may be provided to the sensor unit 12. Details of each sensor included in the sensor unit 12 will be described below.

Outward Camera 120 and Inward Camera 122

As described above, the outward camera 120 captures an image of real space around the user 700, and the inward camera 122 captures the face of the user 700 or the like, and both camera output image capturing information to the above-described control unit 10. Specifically, the outward camera 120 and the inward camera 122 each include a lens system including an image capturing lens, an aperture, a zoom lens, and a focus lens, and a drive system configured to cause the lens system to perform focus operation and zoom operation. In addition, the outward camera 120 and the inward camera 122 each include a solid image sensor array or the like configured to generate an image signal through photoelectric conversion of image capturing light obtained by the above-described lens system. The solid image sensor array may be achieved by, for example, a charge coupled device (CCD) sensor array or a complementary metal oxide semiconductor (CMOS) sensor array.

Microphone 124

The microphone 124 collects voice of the user 700 and environmental sound of surroundings, and outputs collected voice information to the control unit 10. For example, the microphone 124 collects an instruction from the user 700 in voice, and outputs the instruction to the control unit 10. For example, the control unit 10 can recognize the instruction from the user 700 by analyzing voice information output from the microphone 124.

Gyro Sensor 126 and Acceleration Sensor 128

The gyro sensor 126 is achieved by, for example, a three-axis gyro sensor, and senses angular velocity (rotational speed) due to motion of the user 700. The acceleration sensor 128 is achieved by, for example, a three-axis acceleration sensor (also called G sensor), and senses acceleration due to motion of the user 700. An action of the user 700 can be recognized based on results of sensing by these sensors.

Azimuth Sensor 130 and Position Measurement Unit 132

The azimuth sensor 130 is achieved by, for example, a three-axis geomagnetic sensor (compass), and senses an absolute direction (azimuth). The absolute azimuth is an azimuth in a world coordinate system (north, south, east, and west) in real space.

The position measurement unit 132 senses the absolute position of the information processing device 1 (user 700) based on an acquisition signal from outside. The absolute position is a position in a world coordinate system (latitude and longitude) in real space. Specifically, the position measurement unit 132 is achieved by, for example, a global positioning system (GPS) measurement unit, and receives radio waves from GPS satellites, senses a position at which the information processing device 1 (user 700) exists, and outputs information of the sensed position to the control unit 10. The position measurement unit 132 may be a device configured to sense a position through, in place of the GPS, for example, wireless fidelity (Wi-Fi; registered trademark), Bluetooth (registered trademark), transmission and reception with a cellular phone, a personal handy-phone system (PHS), or a smartphone, or short distance communication.

Biosensor 134

The biosensor 134 senses various kinds of living body information of the user 700. Specifically, the biosensor 134 includes, for example, one or a plurality of sensors each directly or indirectly mounted on part of the body of the user 700 and configured to measure the heart rate, blood pressure, brain wave, breathing, sweating, myogenic potential, skin temperature, or electric resistance of the skin of the user 700. The biosensor 134 outputs sensed living body information to the control unit 10.

In addition to the above-described sensors, the sensor unit 12 according to the present embodiment may include, for example, a temperature sensor (not illustrated) configured to sense the temperature of environment around the user 700, and an illuminance sensor (not illustrated) configured to sense the brightness of environment around the user 700. In addition, the sensor unit 12 may include various sensors such as an atmospheric pressure sensor (not illustrated) configured to sense the atmospheric pressure of the environment around the user 700, an infrared sensor (not illustrated) configured to sense infrared rays, and a radio wave sensor (not illustrated) configured to sense radio waves.

Storage Unit 14

The storage unit 14 stores a computer program and a parameter for the control unit 10 described above to execute each function. For example, the storage unit 14 stores the recognition algorithms used in the recognition processing by the information acquisition unit 100, and various thresholds used by the display format determination unit 104.

Display Unit 16

The display unit 16 is achieved by, for example, a lens unit (exemplary see-through display) configured to perform display by using a hologram optical technology, a liquid crystal display (LCD) device, or an organic light emitting diode (OLED) device.

Speaker 18

The speaker 18 plays back a voice signal or the like in accordance with control by the control unit 10 described above. For example, the speaker 18 may be achieved by a pair of earphone speakers (not illustrated) corresponding to the right and left ears of the user 700.

Communication Unit 20

The communication unit 20 is a communication module for performing data transmission and reception with another device in a wired or wireless manner. The communication unit 20 can perform communication with an external instrument directly or through a network access point (not illustrated) by the scheme of, for example, wired local area network (LAN), wireless LAN, Wi-Fi (registered trademark), infrared communication, Bluetooth (registered trademark), or short distance or non-contact communication. The communication unit 20 may be used as a radio wave sensor configured to sense radio wave.

Operation Input Unit 22

The operation input unit 22 is achieved by an operation member (not illustrated) having a physical structure, such as a switch, a button, or a lever. For example, the user 700 can perform desired input to the information processing device 1 by performing an operation on the operation input unit 22. The content of the operation input by the operation input unit 22 may be displayed on the display unit 16 described above.

The configuration of the information processing device 1 according to the present embodiment is specifically described above, but the detailed configuration of the information processing device 1 according to the present embodiment is not limited to the example illustrated in FIG. 2. For example, at least part of the processing at the control unit 10 of the information processing device 1 may be performed at a cloud server (not illustrated) connected through the communication unit 20.

3.2. Exemplary Virtual Object Display According to the First Embodiment

Figure 3:
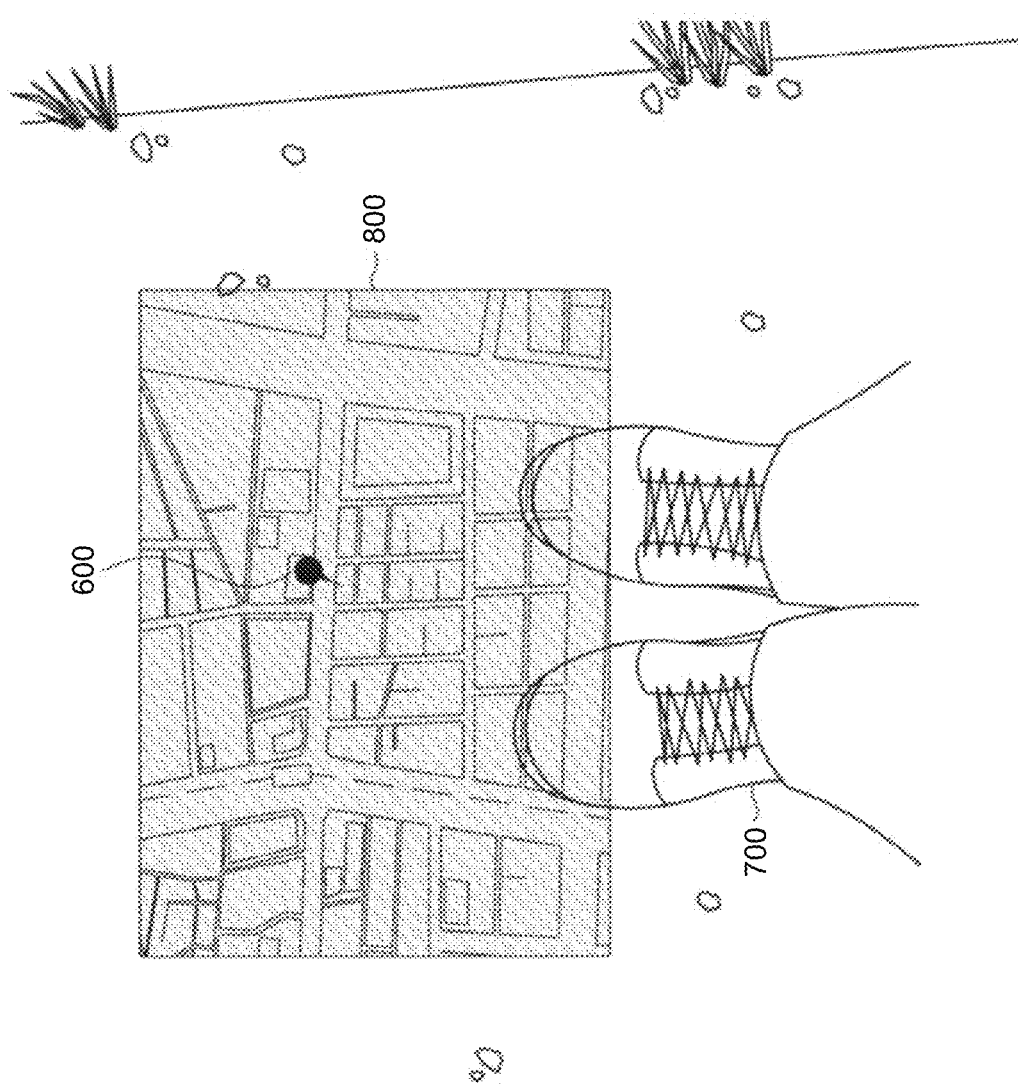
FIG. 3 is an explanatory diagram (1) for describing an exemplary display of a virtual object 800 according to the present embodiment.
Figure 4:
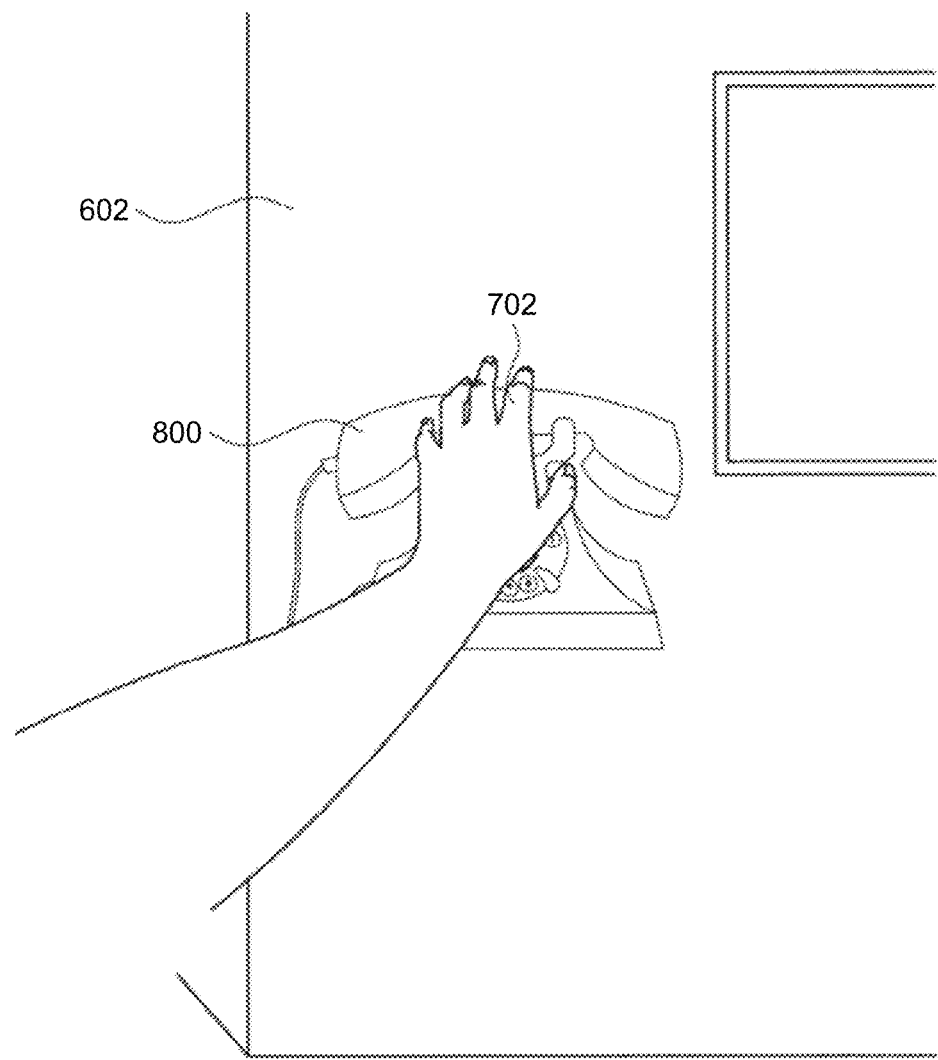
FIG. 4 is an explanatory diagram (2) for describing an exemplary display of the virtual object 800 according to the present embodiment.
Figure 5:
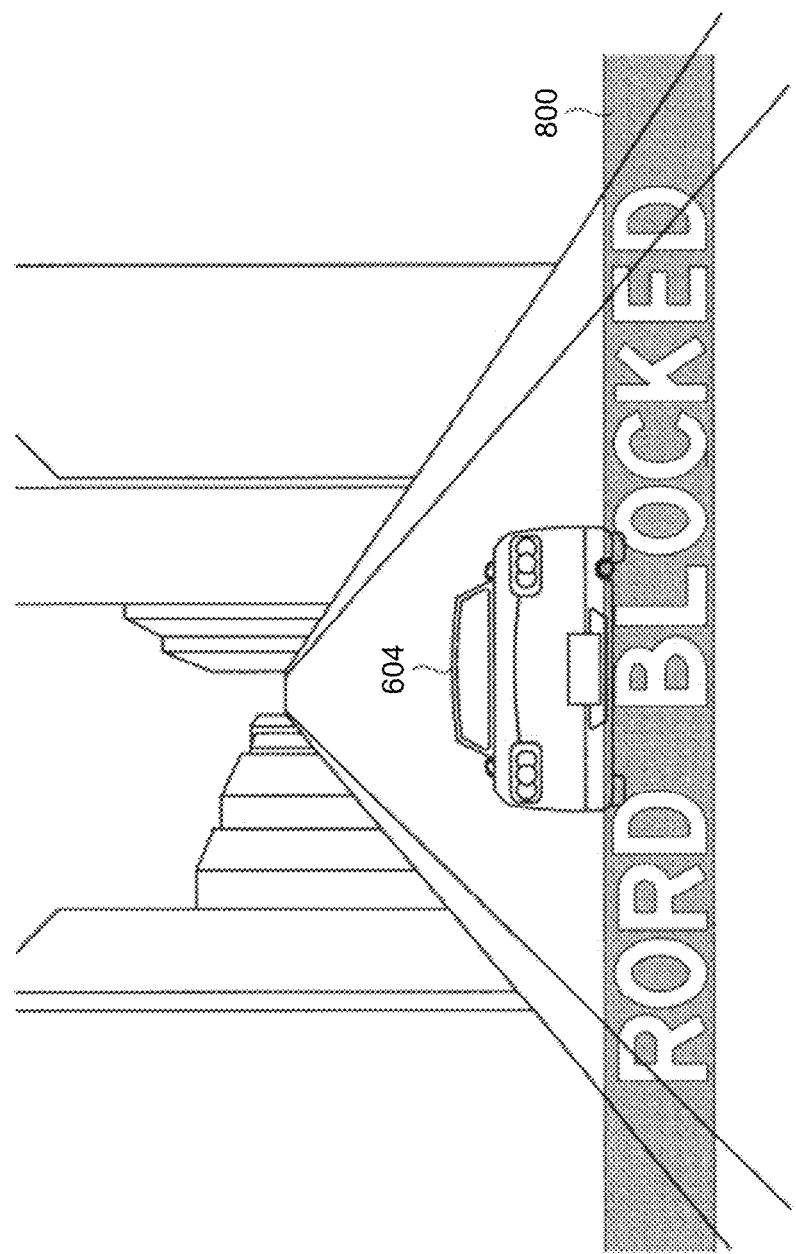
FIG. 5 is an explanatory diagram (3) for describing an exemplary display of the virtual object 800 according to the present embodiment.

The detailed configuration of the information processing device 1 according to the present embodiment is described above. The following describes exemplary virtual object display by the information processing device 1 with reference to FIGS. 3 to 5. FIGS. 3 to 5 are explanatory diagrams for describing exemplary display of a virtual object 800 according to the present embodiment.

The information processing device 1 according to the present embodiment may display the virtual object 800, for example, when the sensor unit 12 senses that a predetermined action is performed by the user 700. As illustrated in FIG. 3, when the sensor unit 12 senses that the head of the user 700 points downward so that the user 700 sees the feet, the information processing device 1 displays the virtual object 800 in a superimposing manner over the feet of the user 700. The virtual object 800 has the form of a map illustrating the position information of the user 700, and specifically, indicates the current position of the user 700 by displaying a virtual marker 600 on the virtual object 800 as the map. The information processing device 1 can present information (in this example, the position information of the user 700) to the user 700 by displaying the virtual object 800 in a superimposing manner over real space. Thus, through the virtual object 800 displayed in this manner, the user 700 can intuitively understand the information presented by the information processing device 1.

In the present embodiment, the information processing device 1 may display the virtual object 800 not only when the orientation of the head of the user 700 has been sensed but also when motion (for example, head shaking or nodding) of the head of the user 700 has been sensed. In addition, the information processing device 1 may display the virtual object 800 when an action of the entire body of the user 700, such as walking, traveling, or stopping has been sensed. Alternatively, the information processing device 1 may display the virtual object 800 when a predetermined motion (gesture such as tilting of a hand, swinging of a hand, or stretching of a hand) of a hand of the user 700 has been sensed by using the outward camera 120 or the like.

In addition, in the present embodiment, the information processing device 1 may display the virtual object 800 when it has been sensed through recognition of the sight line of the user 700 that the user 700 is watching a predetermined real object in real space with interest. The information processing device 1 may display the virtual object 800 when it has been sensed that a predetermined word is spoken by the user 700 or when it has been sensed that an operation is performed on the operation input unit 22 by the user 700.

In addition, the information processing device 1 according to the present embodiment may display the virtual object 800, for example, when the information processing device 1 is in a predetermined state. For example, as illustrated in FIG. 4, the information processing device 1 displays the virtual object 800 having the form of a telephone in a superimposing manner over a wall surface (real object) 602 positioned around the user 700 when voice-call wireless communication from an external device has been sensed. The virtual object 800 has the shape of a telephone for the user 700 to intuitively understand information that a voice call has been received, and the information processing device 1 can present the above-described information to the user 700 by outputting a predetermined ringtone along with the display. In addition, for example, the information processing device 1 may transition to processing of performing a voice call when the outward camera 120 or the like senses that a hand 702 of the user 700 moves toward the virtual object 800 illustrated in FIG. 4.

In the present embodiment, the information processing device 1 may display the virtual object 800 not only when the information processing device 1 has sensed voice-call wireless communication but also when wireless communication from a portable terminal held by a person positioned near the user 700 has been sensed. In addition, the information processing device 1 may change processing to be performed at the information processing device 1 or change the display form of the virtual object when a predetermined operation (for example, touching on the virtual object 800 or holding the virtual object 800) by the user 700 on the virtual object 800 already displayed has been sensed.

In addition, the information processing device 1 according to the present embodiment may display the virtual object 800, for example, when entering of the information processing device 1 (user 700) into a predetermined area has been sensed. For example, as illustrated in FIG. 5, when entering into the predetermined area has been sensed by the position measurement unit 132, the information processing device 1 displays, in a superimposing manner over real space around the user 700, the virtual object 800 having the form of a tape notifying traffic restriction.

In the present embodiment, the information processing device 1 may display the virtual object 800 not only when entering of the information processing device 1 into a predetermined area has been sensed but also when, for example, approaching of the user 700 to a predetermined real object (for example, an automobile 604 in FIG. 5) has been sensed.

In this manner, in the present embodiment, when having sensed a predetermined status or the like, the information processing device 1 can display the virtual object 800 in a superimposing manner over real space. The virtual object 800 is displayed at a position where the virtual object 800 can be reliably visually recognized by the user 700 based on the visual field range of the user 700 sensed by using the inward camera 122 or the like. In addition, when the virtual object 800 for presenting predetermined information is displayed, the information processing device 1 displays the virtual object at an appropriate position in accordance with the information. For example, the following describes a situation in which the information processing device 1 presents warning information to the user 700 of a caved-in road. In this case, the information processing device 1 displays the virtual object 800 at a caved-in place so that the user 700 can perceive as if the virtual object is positioned at the caved-in place.

3.3. Information Processing Method According to First Embodiment

Figure 6A:
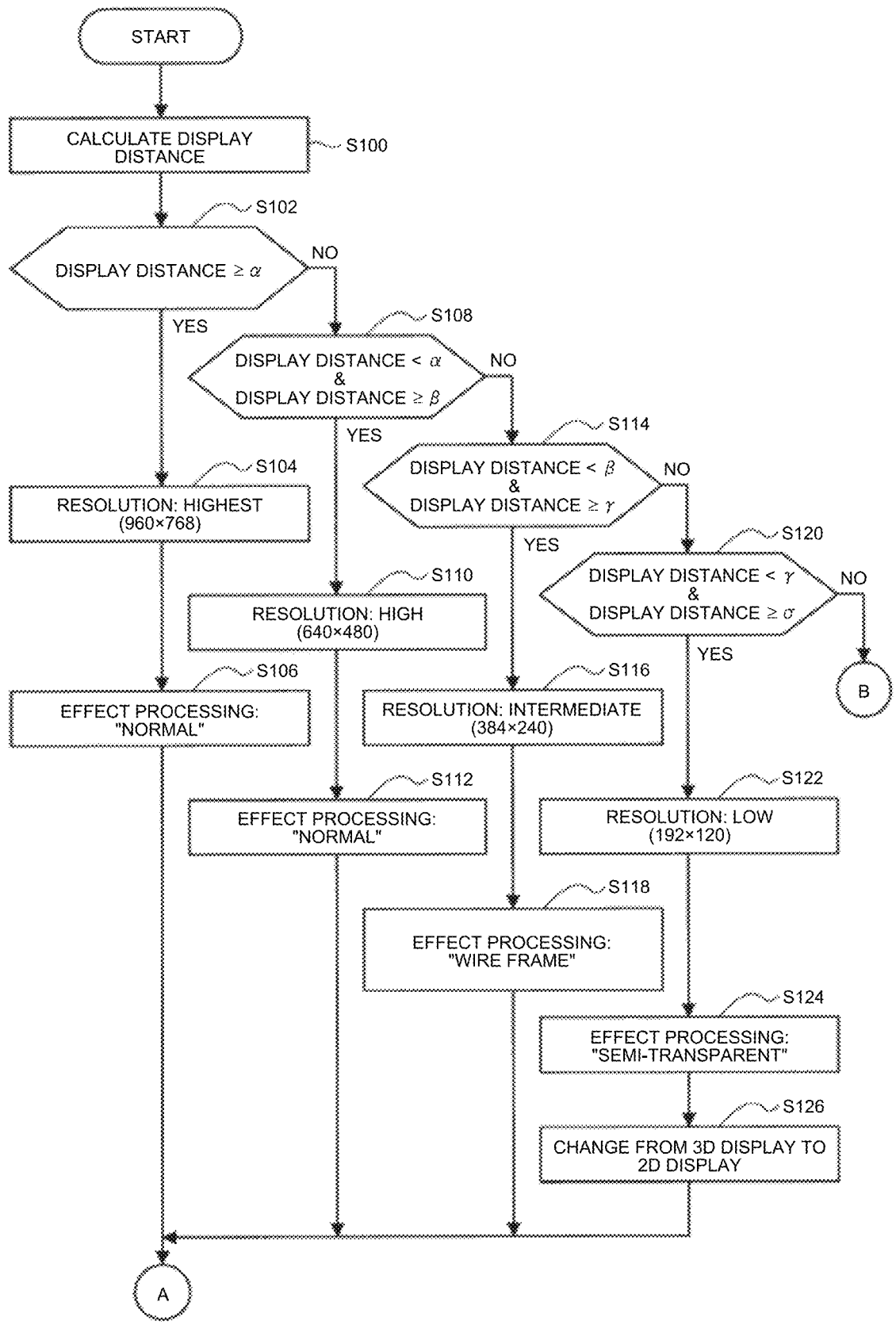
FIG. 6A is a flowchart (1) illustrating processing process according to the present embodiment.
Figure 6B:
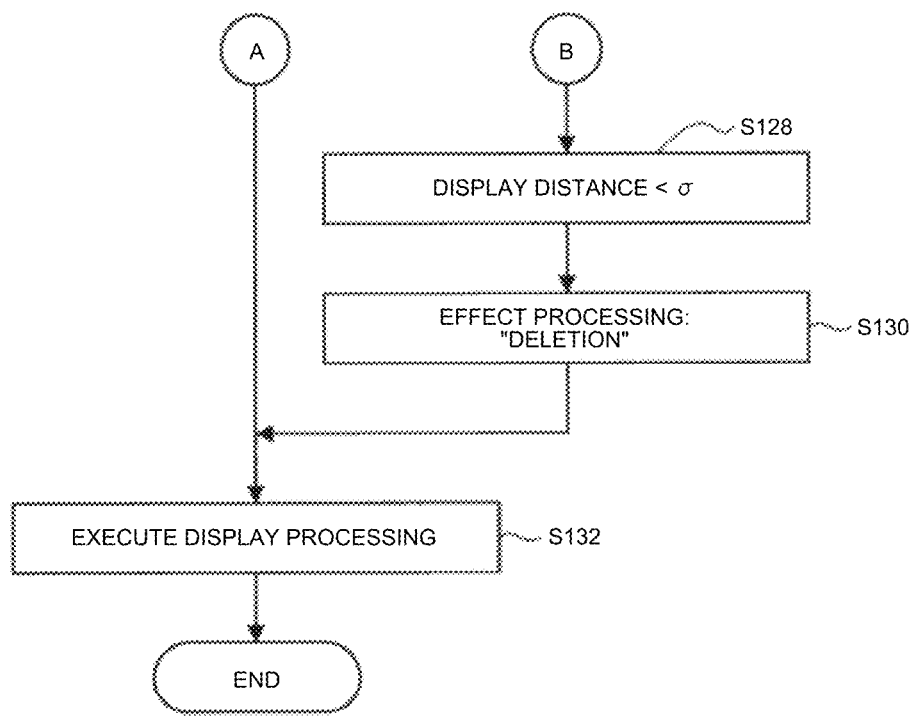
FIG. 6B is a flowchart (2) illustrating the processing process according to the present embodiment.
Figure 7:
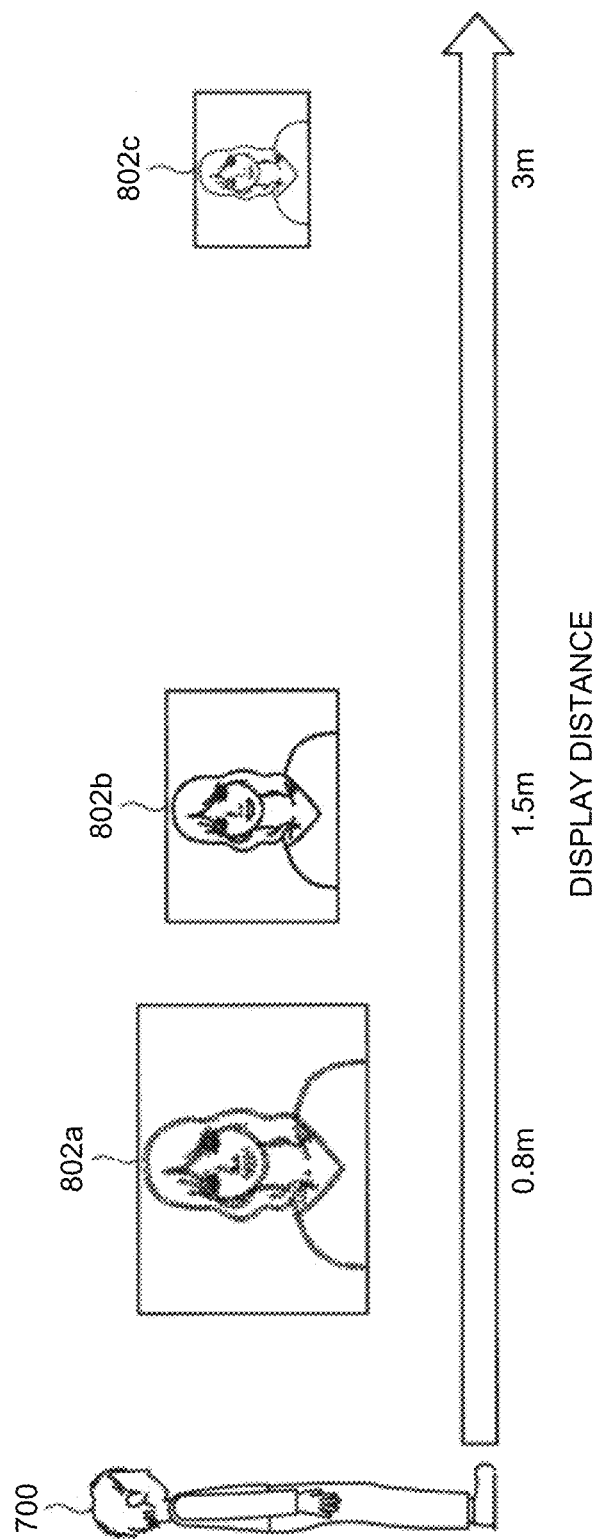
FIG. 7 is an explanatory diagram (1) for describing exemplary processing according to the present embodiment.

The exemplary display of the virtual object 800 according to the present embodiment is described above. The following describes an information processing method according to the present embodiment with reference to FIGS. 6A, 6B, 7, and 8. FIGS. 6A and 6B are each a flowchart illustrating the process of processing according to the present embodiment. FIGS. 7 and 8 are each an explanatory diagram for describing exemplary processing according to the present embodiment. As illustrated in FIGS. 6A and 6B, the information processing method according to the present embodiment includes a plurality of steps S100 to S132. Details of each step included in the method according to the present embodiment will be described below.

As described above, for example, the information processing device 1 starts virtual object display processing when it senses that, for example, a predetermined action is performed by the user 700. The process described below is performed for each display frame of a displayed virtual object and is repeated each time display frames change.

Step S100

The information acquisition unit 100 acquires information related to various states of the user 700 or surroundings of the user 700 by using a sensing result sensed by the sensor unit 12. The information acquisition unit 100 also acquires information such as the display position of the virtual object that is defined by the application configured to perform display of the virtual object. In addition, the display parameter calculation unit 102 calculates the display distance from the user 700 to the display position of the virtual object based on the acquired information of the display position. The display distance of the virtual object can be calculated based on, for example, the display position defined by the application configured to perform display of the virtual object in advance, and the position information of the information processing device 1 (user 700), which is acquired by the above-described SLAM or the like.

Step S102

The display format determination unit 104 compares the display distance calculated at step S100 described above with a threshold α set in advance. Specifically, when the display format determination unit 104 has determined that the calculated display distance is equal to or larger than α (for example, 3 m), the process proceeds to step S104. When the display format determination unit 104 has determined that the calculated display distance is smaller than α, the process proceeds to step S108.

Step S104

The display format determination unit 104 sets the display resolution of the virtual object to the highest rank (for example, 960×768 pixels).

Step S106

The display format determination unit 104 sets effect processing on the virtual object displayed to a normal mode. For example, in the normal mode, the virtual object is provided with processing so that the virtual object is three-dimensionally displayed like a real object in real space.

Step S108

The display format determination unit 104 compares the display distance calculated at step S100 described above with thresholds α and β set in advance. Specifically, when the display format determination unit 104 has determined that the calculated display distance is smaller than α and equal to or larger than β (for example, 1.5 m), the process proceeds to step S110. When the display format determination unit 104 has determined that the calculated display distance is smaller than β, the process proceeds to step S114.

Step S110

The display format determination unit 104 sets the display resolution of the virtual object to a high rank (for example, 640×480 pixels). In this manner, the amount of display processing can be reduced by lowering the display resolution as compared to that at step S104.

Step S112

Similarly to step S106, the display format determination unit 104 sets the effect processing on the virtual object displayed to the normal mode.

Step S114

The display format determination unit 104 compares the display distance calculated at step S100 described above with thresholds β and γ set in advance. Specifically, when the display format determination unit 104 has determined that the calculated display distance is smaller than β and equal to or larger than γ (for example, 0.8 m), the process proceeds to step S116. When the display format determination unit 104 has determined that the calculated display distance is smaller than γ, the process proceeds to step S120.

Step S116

The display format determination unit 104 sets the display resolution of the virtual object to a middle rank (for example, 384×240 pixels).

Step S118

The display format determination unit 104 sets the effect processing on the virtual object to a wire frame mode. For example, in the wire frame mode, the virtual object is provided with processing so that the virtual object is stereoscopically displayed by using wire frames. In other words, in the wire frame mode, the virtual object is displayed as a stereoscopic figure represented only with lines (for example, a virtual object 806*a* illustrated in FIG. 10). In this manner, the amount of display processing can be reduced as compared to the above-described three-dimensional display by displaying the virtual object by using wire frames.

Step S120

The display format determination unit 104 compares the display distance calculated at step S100 described above with thresholds γ and σ set in advance. Specifically, when the display format determination unit 104 has determined that the calculated display distance is smaller than γ and equal to or larger than σ (for example, 0.35 m), the process proceeds to step S122. When the display format determination unit 104 has determined that the calculated display distance is smaller than σ, the process proceeds to step S128.

Step S122

The display format determination unit 104 sets the display resolution of the virtual object to a low rank (for example, 192×120 pixels).

Step S124

The display format determination unit 104 sets the effect processing on the virtual object to a semi-transparent mode. For example, in the semi-transparent mode, the virtual object is provided with processing so that the virtual object is displayed as a semi-transparent figure through which real space can be seen. In this manner, the amount of display processing can be reduced as compared to the above-described three-dimensional display by displaying the virtual object in a semi-transparent manner.

Step S126

The display format determination unit 104 changes setting of the display format of the virtual object from three-dimensional display to two-dimensional display. Thus, the virtual object is displayed as a two-dimensional planar figure. In this manner, the amount of display processing can be reduced as compared to three-dimensional display by displaying the virtual object in a two-dimensional figure.

Step S128

The display format determination unit 104 checks that the display distance calculated at step S100 described above is smaller than σ.

Step S130

The display format determination unit 104 sets the effect processing on the virtual object to a deletion mode. For example, in the deletion mode, the virtual object is not displayed.

Step S132

The output control unit 106 controls the display unit 16 so that the virtual object is displayed in accordance with the display resolution and the effect processing set by the display format determination unit 104 through the above-described series of steps. Then, the display unit 16 displays the virtual object in accordance with the display resolution and the effect processing set by the display format determination unit 104 in addition to a display rule defined by the application. When display of the display frame of the virtual object is completed, the process returns to step S100 to perform display processing of the next display frame.

In the above description, the process is repeated for each display frame of the virtual object, but the present embodiment is not limited thereto. For example, the process may be repeated when change of the state of processing at the information processing device 1 has been sensed or when change of the state of the user 700 has been sensed, but the present embodiment is not particularly limited thereto.

In the present embodiment, the values of the thresholds $\alpha$, $\beta$, $\gamma$, and $\sigma$ and the contents of the set display resolution and the set effect processing indicated in FIGS. 6A, 6B, and 7 described above are not limited to the above-described values and the like. In the present embodiment, any thresholds and the like with which the display quality of the virtual object viewed from the user 700 can be excellently maintained while the display frame rate of the virtual object is excellently maintained may be selected as appropriate. As for the effect processing, for example, the transparency level of the virtual object displayed may be changed, or setting of the display format of the virtual object may be changed from two-dimensional display to three-dimensional display.

In addition, in the above-described process, the display resolution of the virtual object is set to be high when the display distance is long (for example, the display distance is equal to or longer than 3 m), but the present embodiment is not limited thereto. For example, when the display distance is long, in other words, when the virtual object is displayed at a position far from the user 700, the display resolution may be set to the middle rank or the low rank because the user 700 is unlikely to perceive difference in the display quality of the virtual object.

FIG. 7 is a diagram schematically illustrating the processing in the above-described process. FIG. 7 schematically illustrates change of the size and display resolution of the virtual object in a displayed person image in accordance with the display distance from the user 700 to the display position of the virtual object. For example, when the display distance is short (for example, 0.8 m approximately), a virtual object 802a having a large size and a low display resolution is displayed. The virtual object 802a is displayed entirely blurred and pale as illustrated in FIG. 7. For example, when the display distance is intermediate (for example, 1.5 m approximately), a virtual object 802b having a smaller size and a higher display resolution than those of the virtual object 802a is displayed. In addition, when the display distance is long (for example, 3 m approximately), a virtual object 802c having a smaller size and a higher display resolution than those of the virtual object 802b is displayed. As illustrated in FIG. 7, the size (display area) of the virtual object 802a increases as the display distance to the user 700 decreases so that a sense of perspective can be obtained. In other words, in the present embodiment, when the display distance of the virtual object is equal to the first distance, the display area of the virtual object is set to be larger than that of another virtual object for which the display distance is equal to the second distance shorter than the first distance so that the user 700 can feel a sense of perspective. Accordingly, the size of the virtual object is increased as the display distance decreases to indicate a sense of perspective. Thus, in the present embodiment, the resolution is controlled to reduce the amount of display processing that increases along with the above-described display area increase.

The following describes exemplary virtual object display through the above-described process with reference to FIG. 8. As illustrated on the left side in FIG. 8, a virtual object 804a is displayed at a position far from the user 700 in a superimposing manner over the automobile 604 as a real object in real space. Then, the display distance between the display position of the virtual object and the user 700 decreases as the user 700 moves closer to the above-described automobile 604. Thus, in such a case, as illustrated on the right side in FIG. 8, a virtual object 804b is displayed in a larger size and a lower display resolution than those of the virtual object 804a. In addition, the virtual object 804b is displayed as a semi-transparent figure through which a real object (for example, the automobile 604) in real space can be seen.

When a large virtual object is displayed due to a close display position, the processing amount of display of the virtual object increases and the processing capacity of the information processing device 1 has no allowance, thereby causing display frame rate decrease in some cases. Thus, in the present embodiment, the display position of the virtual object that can cause the increase of the amount of display processing is sensed, and the display resolution of the virtual object and the like are dynamically changed in accordance with the sensed display position. In this manner, according to the present embodiment, allowance can be ensured in the processing capacity of the information processing device 1 before the display frame rate decreases, thereby avoiding the display frame rate decrease. Thus, according to the present embodiment, the quality of the virtual object viewed from the user 700 can be excellently maintained while the display frame rate of the virtual object is excellently maintained. As a result, according to the present embodiment, real-time interaction between the user 700 and the information processing device 1 through the virtual object can be achieved, and beneficial experience can be provided to the user 700. In addition, according to the present embodiment, the amount of display processing at the information processing device 1 can be reduced by dynamically changing the display resolution of the virtual object and the like, and accordingly, electric power consumption can be reduced. As a result, according to the present embodiment, reduced battery capacity can be achieved to provide the information processing device 1 in a smaller size.

4. Second Embodiment

In the above-described first embodiment of the present disclosure, the display resolution of the virtual object and the like are dynamically changed in accordance with the display distance. However, in the embodiment of the present disclosure, the display resolution of the virtual object and the like may be changed in accordance with not only the display distance but also another amount of virtual object display processing. Thus, in a second embodiment of the present disclosure, the display resolution of the virtual object and the like are changed in accordance with the display area of the virtual object. As described above, the amount of display processing at the information processing device 1 changes in accordance with the size of the virtual object. Thus, for example, when a large virtual object is displayed, the amount of display processing increases and the processing capacity of the information processing device 1 has no allowance, thereby causing display frame rate decrease in some cases. Thus, in the present embodiment, the state that causes the decrease of the display frame rate of the virtual object, in other words, the display area of the virtual object that can cause the decrease of the display frame rate of the virtual object is sensed. In addition, in the present embodiment, the display resolution of the virtual object and the like are changed in accordance with the sensed display area. Thus, according to the present embodiment, allowance can be ensured in the processing capacity of the information processing device 1, thereby avoiding the decrease of the display frame rate of the virtual object. Details of the present embodiment will be described below.

The information processing device 1 according to the second embodiment has a detailed configuration same as that in the first embodiment, and thus description thereof is omitted.

4.1. Information Processing Method According to Second Embodiment

Figure 9A:
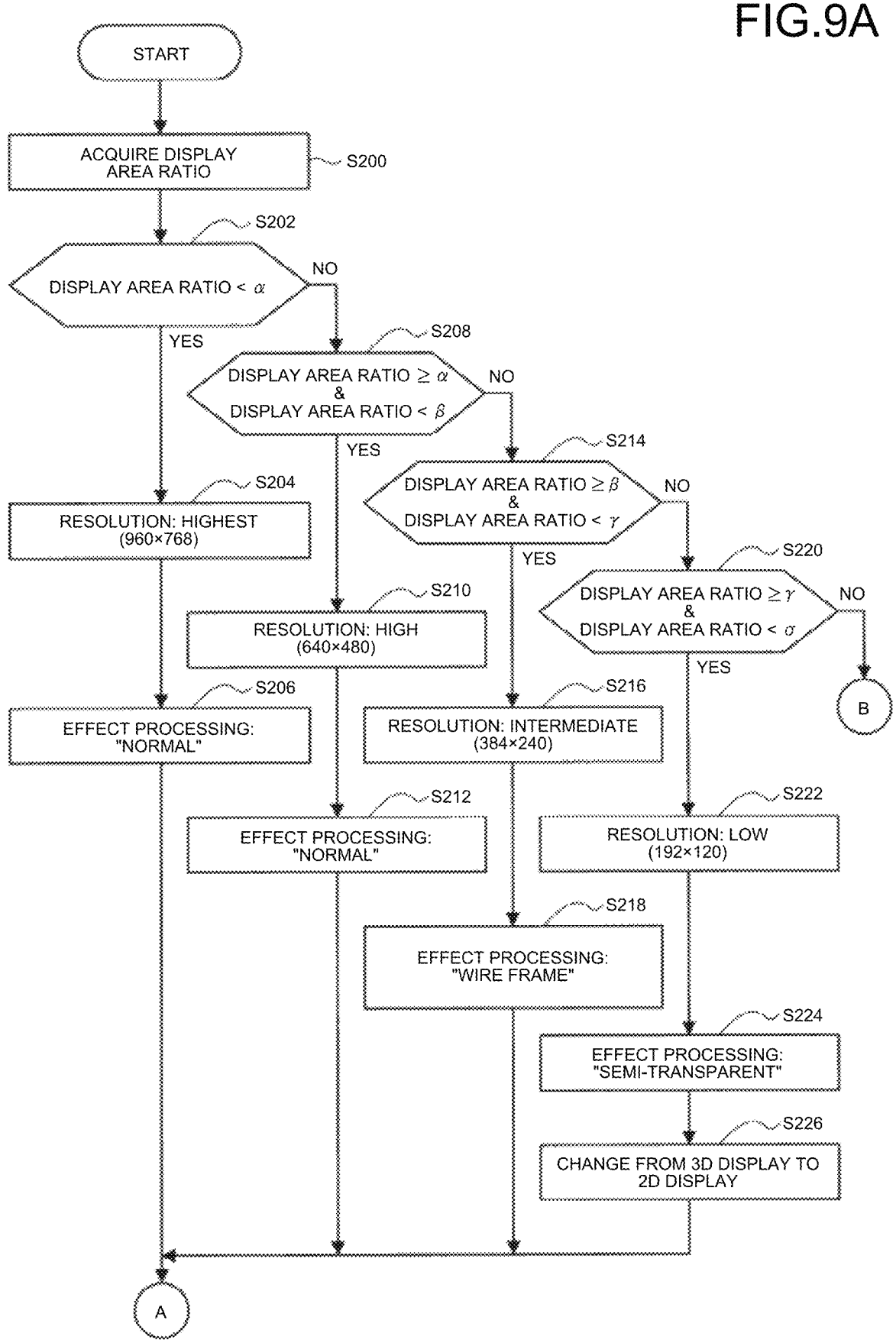
FIG. 9A is a flowchart (1) illustrating a processing process according to the first embodiment of the present disclosure.
Figure 9B:
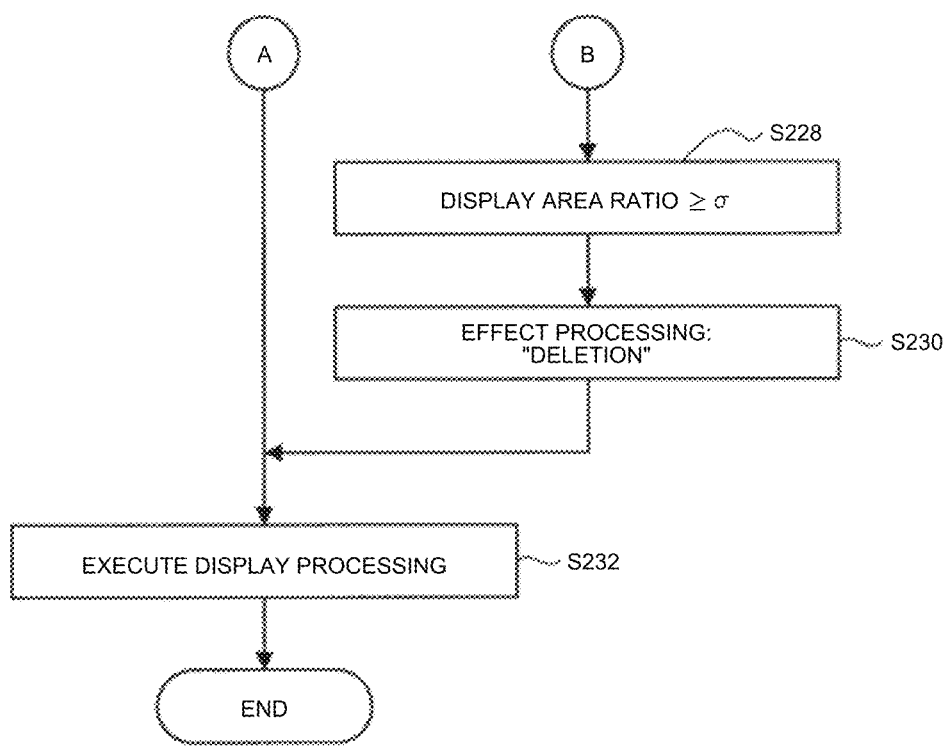
FIG. 9B is a flowchart (2) illustrating the processing process according to the present embodiment.

The following describes an information processing method according to the second embodiment with reference to FIGS. 9A, 9B, and 10. FIGS. 9A and 9B is each a flowchart illustrating the process of processing according to the present embodiment. FIG. 10 is an explanatory diagram for describing exemplary processing according to the present embodiment. As illustrated in FIGS. 9A and 9B, the information processing method according to the present embodiment includes a plurality of steps S200 to S232. Details of each step included in the information processing method according to the present embodiment will be described below. The following describes only any feature different from that of the first embodiment and omits description of any feature the same as that of the first embodiment.

In the following description, a display area ratio of the virtual object means the ratio of the display area of the virtual object displayed relative to displayable display area of the display unit 16.

The information processing device 1 starts the virtual object display processing. Similarly to the first embodiment, the process described below is performed for each display frame of the virtual object displayed and is repeated upon each display frame change.

Step S200

The information acquisition unit 100 acquires information related to various states of the user 700 or surroundings of the user 700 by using a sensing result sensed by the sensor unit 12. The information acquisition unit 100 also acquires information such as the display area of the virtual object that is defined by the application configured to perform display of the virtual object. In addition, the display parameter calculation unit 102 calculates the above-described display area ratio based on the acquired display area information.

Step S202

The display format determination unit 104 compares the display area ratio calculated at step S200 described above with a threshold $\alpha$ set in advance. Specifically, when the display format determination unit 104 has determined that the calculated display area ratio is smaller than $\alpha$ % (for example, 10%), the process proceeds to step S204. When the display format determination unit 104 has determined that the calculated display area ratio is equal to or larger than $\alpha$ %, the process proceeds to step S208.

Steps S204 and S206

Processing same as that at steps S104 and S106 in the first embodiment illustrated in FIG. 6A is performed.

Step S208

The display format determination unit 104 compares the display area ratio calculated at step S200 described above with thresholds $\alpha$ and $\beta$ set in advance. Specifically, when the display format determination unit 104 has determined that the calculated display area ratio is equal to or larger than $\alpha$ % and smaller $\beta$ % (for example, 20%), the process proceeds to step S210. When the display format determination unit 104 has determined that the calculated display area ratio is equal to or larger than $\beta$ %, the process proceeds to step S214.

Steps S210 and S212

Processing same as that at steps S110 and S112 in the first embodiment illustrated in FIG. 6A is performed.

Step S214

The display format determination unit 104 compares the display area ratio calculated at step S200 described above with thresholds $\beta$ and $\gamma$ set in advance. Specifically, when the display format determination unit 104 has determined that the calculated display area ratio is equal to or larger than $\beta$ % and smaller than $\gamma$ % (for example, 30%), the process proceeds to step S216. When the display format determination unit 104 has determined that the calculated display area ratio is equal to or larger than $\gamma$ %, the process proceeds to step S220.

Steps S216 and S218

Processing same as that at steps S116 and S118 in the first embodiment illustrated in FIG. 6A is performed.

Step S220

The display format determination unit 104 compares the display area ratio calculated at step S200 described above with thresholds $\gamma$ and $\sigma$ set in advance. Specifically, when the display format determination unit 104 has determined that the calculated display area ratio is equal to or larger than $\gamma$ % and smaller than $\sigma$ % (for example, 50%), the process proceeds to step S222. When the display format determination unit 104 has determined that the calculated display area ratio is equal to or larger than $\sigma$ %, the process proceeds to step S228.

Steps S222, S224, and S226

Processing same as that at steps S122, S124, and S126 in the first embodiment illustrated in FIG. 6A is performed.

Step S228

The display format determination unit 104 checks that the display area ratio calculated at step S200 described above is equal to or larger than $\sigma$ %.

Steps S230 and S232

Processing same as that at steps S130 and S132 in the first embodiment illustrated in FIG. 6A is performed.

Similarly to the first embodiment, in the present embodiment, the values of thresholds α, β, γ, and σ and the contents of the set display resolution and the set effect processing indicated in FIGS. 9A and 9B described above are not limited to the above-described values and the like. In the present embodiment, any thresholds and the like with which the quality of the virtual object viewed from the user 700 can be excellently maintained while the display frame rate of the virtual object is excellently maintained may be selected as appropriate.

FIG. 10 is a diagram schematically illustrating the processing in the above-described process. FIG. 10 schematically illustrates change of the display resolution and display format (wire frame display) of a virtual object displayed in a spherical shape in accordance with the display area of the virtual object. For example, when the display area of the virtual object is large, the spherical virtual object 806*a* having a low display resolution is displayed in wire frame display. When the display area is intermediate, a virtual object 806*b* having a higher display resolution than that of the virtual object 806*a* and having a polygonal shape extremely approximate to a spherical shape is displayed. In addition, when the display area is small, a virtual object 806*c* having a higher display resolution than that of the virtual object 806*b* and having a spherical shape is displayed.

As described above, when a large virtual object is displayed, the processing amount of display of the virtual object increases and the processing capacity of the information processing device 1 has no allowance, thereby causing display frame rate decrease in some cases. Thus, in the present embodiment, the display area of the virtual object that can cause the increase of the amount of display processing is sensed, and the display resolution of the virtual object and the like are dynamically changed in accordance with the sensed display area. In this manner, according to the present embodiment, allowance can be ensured in the processing capacity of the information processing device 1 before the display frame rate decreases, thereby avoiding the display frame rate decrease.

4.2. Modification of Second Embodiment

In the second embodiment described above, the display resolution of the virtual object and the like are dynamically changed in accordance with the display area. However, as described above, in the present embodiment, the display resolution of the virtual object and the like may be changed in accordance with another amount of virtual object display processing. For example, in a modification described below, the display resolution of the virtual object and the like are changed in accordance with the number of displayed virtual objects. Specifically, the amount of display processing at the information processing device 1 changes in accordance with the number of displayed virtual objects. Thus, when a large number of virtual objects are displayed, the amount of display processing increases and the processing capacity of the information processing device 1 has no allowance, thereby causing display frame rate decrease in some cases. Thus, in the present modification, the display resolution of the virtual object and the like are changed in accordance with the number of displayed virtual objects that can cause the decrease of the display frame rate of the virtual object. Thus, according to the present modification, allowance can be ensured in the processing capacity of the information processing device 1, thereby avoiding the decrease of the display frame rate of the virtual object.

Details of the present modification will be described below with reference to FIG. 11. FIG. 11 is an explanatory diagram for describing exemplary processing according to the modification of the second embodiment, and specifically, schematically illustrates change of the display resolution and display format (wire frame display) of the virtual object displayed in a spherical shape in accordance with the number of displayed virtual objects. As illustrated in FIG. 11, when the number of displayed virtual objects is large (for example, equal to or larger than six), a virtual object 808*a* having a low display resolution and a spherical shape is displayed in wire frame display. When the display number is intermediate (for example, smaller than six and equal to or larger than three), a virtual object 808*b* having a higher display resolution than that of the virtual object 808*a* and having a polygonal shape extremely approximate to a spherical shape is displayed. In addition, when the display number is small (for example, smaller than three), a virtual object 808*c* having a higher display resolution than that of the virtual object 808*b* and having a spherical shape is displayed.

In the present modification, the amount of display processing at the information processing device 1 changes in accordance with the type (text data, object, moving image, symbol, or the like) of the virtual object, and thus the display resolution of the virtual object and the like may be changed in accordance with the type of the virtual object. Specifically, when the virtual object is a moving image, the amount of display processing is larger than when the virtual object is a symbol. Thus, in the present modification, when the virtual object is a moving image, the display resolution of the virtual object and the like are reduced.

In the present modification, when the virtual object moves in front of the eyes of the user 700, the amount of display processing at the information processing device 1 changes in accordance with the moving speed of the virtual object, and thus the display resolution of the virtual object and the like may be changed in accordance with the moving speed. Specifically, when the virtual object moves at high speed, the amount of display processing is larger than when the virtual object moves at low speed. Thus, in the present modification, when the virtual object moves at high speed, the display resolution of the virtual object and the like are reduced.

5. Third Embodiment

In the first and second embodiments described above, the display resolution of the virtual object and the like are dynamically changed in accordance with the display distance of the virtual object or the like. However, in the embodiment of the present disclosure, the display resolution of the virtual object and the like may be dynamically changed in accordance with not only the processing amount of display of the virtual object as described above but also the state of processing performed by the control unit 10.

For example, the amount of processing at the information processing device 1 increases when the virtual object to be displayed has a complex shape for which complicated processing is needed. In this case, as described above, the processing capacity of the information processing device 1 has no allowance, thereby causing the display frame rate decrease in some cases.

Figure 12:
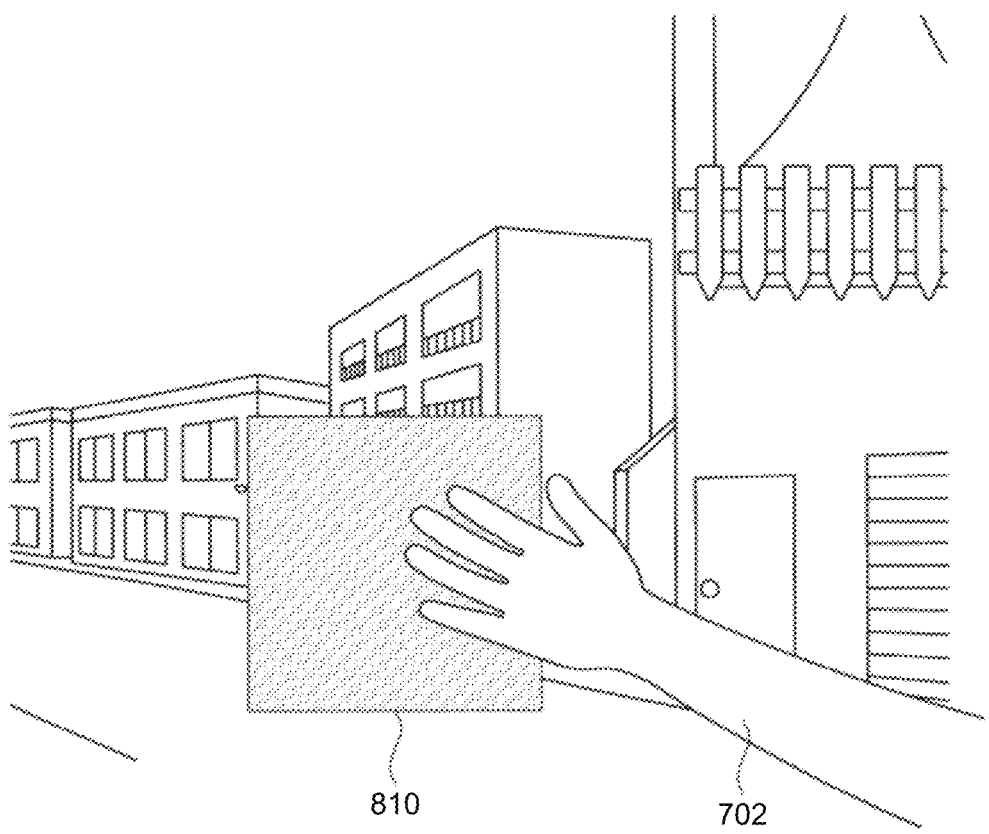
FIG. 12 is an explanatory diagram for describing an exemplary display of a virtual object 810 according to a third embodiment of the present disclosure.

The following describes a more specific example with reference to FIG. 12. FIG. 12 is an explanatory diagram for describing exemplary display of a virtual object 810 according to the present embodiment, and specifically, illustrates the virtual object 810 displayed in a superimposing manner over real space. As illustrated in FIG. 12, the user 700 moves the hand 702 toward the virtual object 810 displayed in front of the eyes of the user 700. In such a situation, the virtual object 810 is displayed as if the virtual object 810 is positioned behind the hand 702 of the user 700 so that the user 700 perceives the virtual object 810 as a real object existing in real space. In other words, the virtual object 810 is displayed as if the hand 702 of the user 700 is positioned in front of the virtual object 810 and screens part of the virtual object 810. In the following description, a state in which part or all of the virtual object 810 is screened by the hand 702 of the user 700 or the like in this manner is referred to as "hand screening". The information processing device 1 performs display processing as described below to display the virtual object 810 being hand-screened. First, the information processing device 1 acquires the shape of the virtual object defined by the application for displaying the virtual object, and an image of the hand 702 captured by the outward camera 120 or the like. Subsequently, the information processing device 1 generates, by using the acquired information, the virtual object 810 having a shape obtained by removing the part screened by the hand 702 from the defined shape of the virtual object, and displays the generated virtual object 810. Such display processing requires a large processing amount and has a large load on the information processing device 1, and thus decrease of the display frame rate of the virtual object occurs.

Thus, in the present embodiment, it is sensed in real time that the processing state has approached a threshold of the processing capacity of the information processing device 1, and the display resolution of the virtual object and the like are dynamically changed based on a result of the sensing. More specifically, in the present embodiment, the display frame rate is sensed as an index indicating the state of processing at the information processing device 1. Specifically, when the display frame rate of the virtual object is high, the display frame rate indicates the processing capacity of the information processing device 1 has allowance, or when the display frame rate is low, the display frame rate indicates that the processing capacity of the information processing device 1 has no allowance. In other words, the display frame rate can be used as an index indicating the state of processing at the information processing device 1. In the present embodiment, the display frame rate used as an index is the number of frames per second, and thus in the following description, the display frame rate is referred to as frames per second (FPS). Thus, in the present embodiment, the display resolution and the like of the virtual object 810 are dynamically changed in accordance with the FPS. Specifically, when the FPS is high, the FPS means that the processing capacity of the information processing device 1 has allowance, and thus the display resolution of the virtual object and the like can be set to be high. When the FPS is low, the FPS means that the processing capacity of the information processing device 1 has allowance, and thus the display resolution of the virtual object and the like are set to be low. In this manner, in the present embodiment, decrease of the FPS is directly sensed and the display resolution of the virtual object and the like are changed in accordance with the sensed FPS to ensure allowance in the processing capacity of the information processing device 1, thereby avoiding decrease of the FPS in the following display frame. Details of the present embodiment will be described below.

The information processing device 1 according to a third embodiment has a detailed configuration same as that in the first embodiment, and thus description thereof is omitted.

5.1. Information Processing Method According to Third Embodiment

Figure 13:
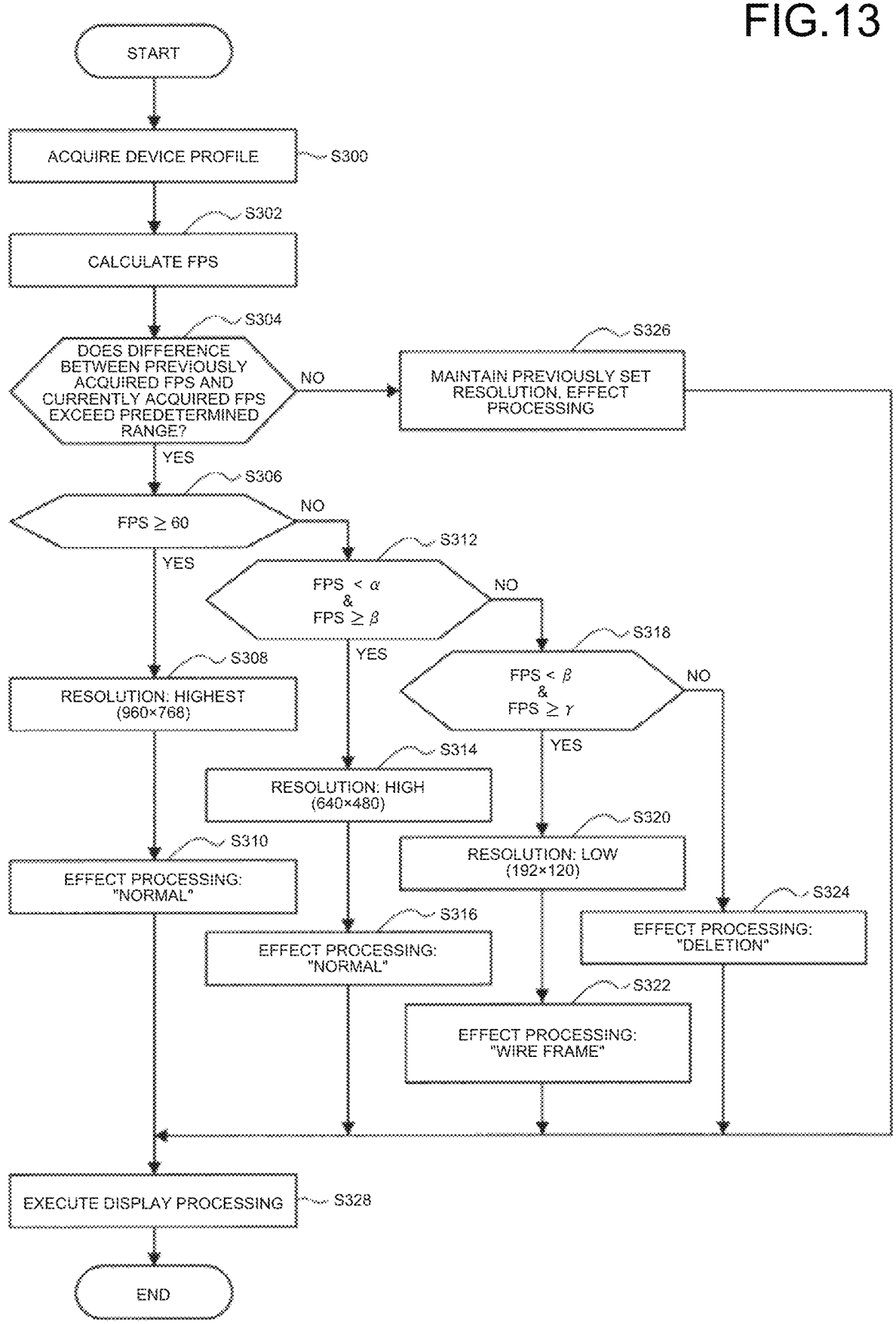
FIG. 13 is a flowchart illustrating processing process according to the present embodiment.
Figure 14:
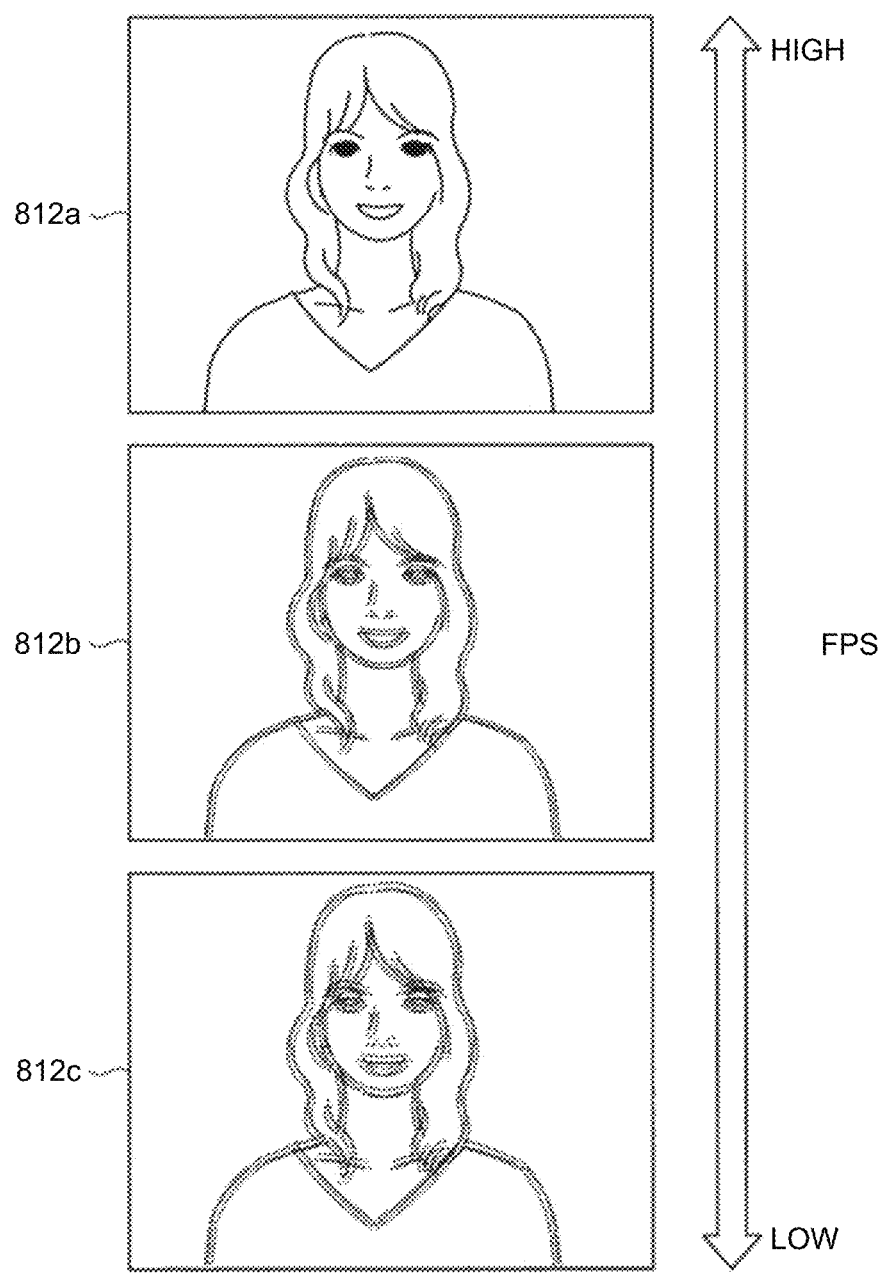
FIG. 14 is an explanatory diagram for describing exemplary processing according to the present embodiment.

The following describes an information processing method according to the third embodiment with reference to FIGS. 13 and 14. FIG. 13 is a flowchart illustrating the process of processing according to the present embodiment. FIG. 14 is an explanatory diagram for describing exemplary processing according to the present embodiment. As illustrated in FIG. 13, the information processing method according to the present embodiment includes a plurality of steps S300 to S328. Details of each step included in the information processing method according to the present embodiment will be described below. The following describes only any feature different from that of the first embodiment and omits description of any feature same as that of the first embodiment.

The information processing device 1 starts the virtual object display processing. The process described below is performed for each display frame of the virtual object displayed and is repeated upon each display frame change.

Step S300

The information acquisition unit 100 acquires information related to various states of the user 700 or surroundings of the user 700 by using a sensing result sensed by the sensor unit 12. The information acquisition unit 100 also acquires a display processing speed indicating the state of processing at the information processing device 1. In addition, the information acquisition unit 100 may acquire any other device profile (for example, recognition frame rates at the various recognition engines described above), in other words, a device profile acquired by the information acquisition unit 100 is not particularly limited but only needs to be information indicating the state of processing at the information processing device 1.

Step S302

The display parameter calculation unit 102 calculates the FPS of the virtual object based on the display processing speed acquired at step S300.

Step S304

The display format determination unit 104 determines whether the difference between an FPS previously calculated and the FPS currently calculated at step S302 exceeds a predetermined range (for example, 10). For example, when the display format determination unit 104 has determined that the above-described difference exceeds 10, the process proceeds to step S304, or when the display format determination unit 104 has determined that the above-described difference is equal to or smaller than 10, the process proceeds to step S326.

Step S306

The display format determination unit 104 compares the FPS calculated at step S302 described above with a threshold α set in advance. Specifically, when the display format determination unit 104 has determined that the calculated FPS is equal to or larger than α (for example, 60), the process proceeds to step S308. When the display format determination unit 104 has determined that the calculated FPS is smaller than α, the process proceeds to step S312.

Steps S308 and S310

Processing same as that at steps S104 and S106 in the first embodiment illustrated in FIG. 6A is performed.

Step S312

The display format determination unit 104 compares the FPS calculated at step S302 described above with thresholds α and β set in advance. Specifically, when the display format determination unit 104 has determined that the calculated FPS is smaller than α and equal to or larger than β (for example, 30), the process proceeds to step S314. When the display format determination unit 104 has determined that the calculated FPS is smaller than β, the process proceeds to step S318.

Steps S314 and S316

Processing same as that at steps S110 and S112 in the first embodiment illustrated in FIG. 6A is performed.

Step S318

The display format determination unit 104 compares the FPS calculated at step S302 described above with thresholds β and γ set in advance. Specifically, when the display format determination unit 104 has determined that the calculated FPS is smaller than β and equal to or larger than γ (for example, 20), the process proceeds to step S320. When the display format determination unit 104 has determined that the calculated FPS is smaller than γ, the process proceeds to step S324.

Steps S320 and S324

Processing same as that at step S116 in the first embodiment illustrated in FIG. 6A is performed as step S320, and processing same as that at step S130 in the first embodiment illustrated in FIG. 6B is performed as step S324.

Step S326

The display format determination unit 104 maintains a previously set display resolution and previously set effect processing.

Step S328

Processing same as that at step S132 in the first embodiment illustrated in FIG. 6B is performed.

In the above description, whether to change various settings of the display resolution and the like is determined in accordance with the difference from the previously calculated FPS for each display frame of the virtual object, but the present embodiment is not limited thereto. For example, whether to change the various settings may be determined when a predetermined time has elapsed since the previous setting, when movement of the user 700 has been sensed, or when it has been sensed that the display position of the virtual object has moved out of the visual field range of the user 700.

Similarly to the first embodiment, in the present embodiment, the values of the thresholds α, β, and γ and the contents of the set display resolution and the set effect processing illustrated in FIG. 13 described above are not limited to the above-described values and the like. In the present embodiment, any thresholds and the like with which the display quality of the virtual object viewed from the user 700 can be excellently maintained while the FPS of the virtual object is excellently maintained may be selected as appropriate.

FIG. 14 is a diagram schematically illustrating the processing in the above-described process. FIG. 14 schematically illustrates change of the display resolution of the virtual object in a person image in accordance with the FPS. For example, when the FPS is high, a virtual object 812a having a high display resolution is displayed. For example, when the FPS is intermediate, a virtual object 812b having a lower display resolution than that of the virtual object 812a is displayed. When the FPS is low, a virtual object 812c having a lower display resolution than that of the virtual object 812b is displayed.

As described above, in the present embodiment, since whether the processing capacity of the information processing device 1 has allowance can be determined based on the FPS, the display resolution of the virtual object and the like are dynamically changed in accordance with the FPS. Thus, according to the present embodiment, allowance can be ensured in the processing capacity of the information processing device 1, thereby avoiding decrease of the FPS in the following display frame.

In the present embodiment, when the processing capacity of the information processing device 1 (control unit 10) is distributed to at least the virtual object display processing and the recognition processing performed by the recognition engines for recognizing various states of surroundings of the user 700 and the like, the display detail level of the virtual object may be changed in accordance with the state of the processing capacity distributed to the recognition processing. When the ratio of the processing capacities of the information processing device 1 distributed to the display processing and the recognition processing changes in accordance with a request from the user 700 or the like, the display detail level of the virtual object may be changed in accordance with the ratio of distribution to each processing.

In addition, in the present embodiment, not only the display resolution of the virtual object and the like may be changed in accordance with the FPS but also the display resolution of the virtual object and the like may be dynamically changed in accordance with information related to the processing state and obtained from the device profile. For example, the recognition frame rates of the recognition engines for recognizing various states of the user 700 or surroundings of the user 700 may be acquired from the device profile, and the display resolution of the virtual object and the like may be dynamically changed in accordance with the recognition frame rates.

5.2. Modification of Third Embodiment

In the above-described third embodiment of present disclosure, the display resolution of the virtual object is dynamically changed in accordance with the FPS. However, the present embodiment is not limited to the change of the display resolution, but any other display detail level of the virtual object may be changed. The following describes various examples of the display detail level of the virtual object as modifications of the present embodiment.

Modification 1

Figure 15:
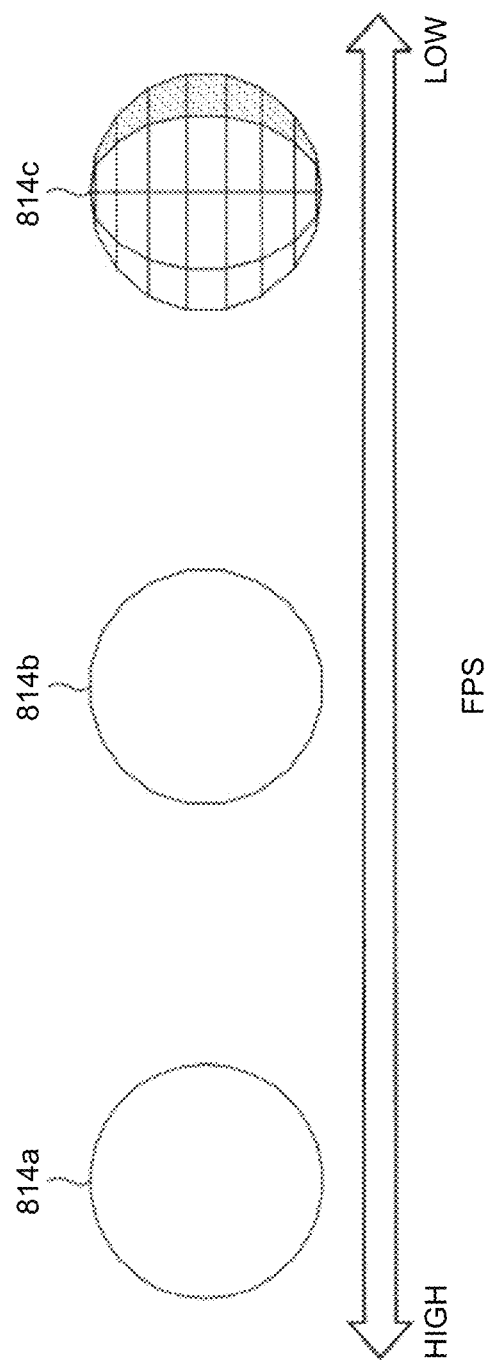
FIG. 15 is an explanatory diagram for describing exemplary processing according to Modification 1 of the present embodiment.

In Modification 1, shading processing is dynamically changed as the effect processing on the virtual object in accordance with the FPS. Details of the present modification will be described below with reference to FIG. 15. FIG. 15 is an explanatory diagram for describing exemplary processing according to Modification 1.

Specifically, when the FPS is high as illustrated on the left side in FIG. 15, the FPS means that the processing capacity of the information processing device 1 has allowance, and thus the virtual object is displayed by, for example, a Phong shading method. The Phong shading method performs shading calculation of the virtual object by using a model of light reflection at the surface of a stereoscopic object, and sets the color and the like of each pixel for displaying the virtual object based on the shading calculation. When the Phong shading method is used, a virtual object 814a is displayed as if it is a real object existing in real space. The shading calculation by the Phong shading method requires a large amount (load) of processing at the information processing device 1. Thus, in the present modification, the virtual object is displayed by using the Phong shading method when the processing capacity of the information processing device 1 has allowance.

When the FPS is intermediate as illustrated at the center in FIG. 15, the processing capacity of the information processing device 1 has some allowance, and thus the virtual object is displayed by, for example, a Gouraud shading method. The Gouraud shading method performs shading calculation of the virtual object by using a model of light reflection at the surface of the virtual object having a polygonal shape, and sets the color and the like of each pixel for displaying the virtual object based on the shading calculation. When the Gouraud shading method is used, a virtual object 814b is displayed as if it is a stereoscopic object although the quality of appearance is lower than that of the virtual object 814a. Since the shading calculation is performed based on an assumption that the virtual object 814b is a polygonal shape, the Gouraud shading method requires a smaller amount (load) of processing at the information processing device 1 than the Phong shading method. Thus, in the present modification, the virtual object is displayed by using the Gouraud shading method with a smaller load when the processing capacity of the information processing device 1 has some allowance.

In addition, when the FPS is low as illustrated on the right side in FIG. 15, the processing capacity of the information processing device 1 has no allowance, and thus the virtual object is displayed by, for example, a flat shading method. The flat shading method performs shading calculation of the virtual object by using a model of light reflection at each face of the virtual object having a rough polygonal shape, and sets the color and the like of each face of the virtual object based on the shading calculation. When the flat shading method is used, the quality of appearance of a virtual object 814c is lower than the virtual object 814b. However, in the present modification, the flat shading method requires a smaller amount (load) of processing at the information processing device 1 than the Gouraud shading method even when the processing capacity of the information processing device 1 has no allowance, thereby avoiding decrease of the FPS.

Modification 2

Figure 16:
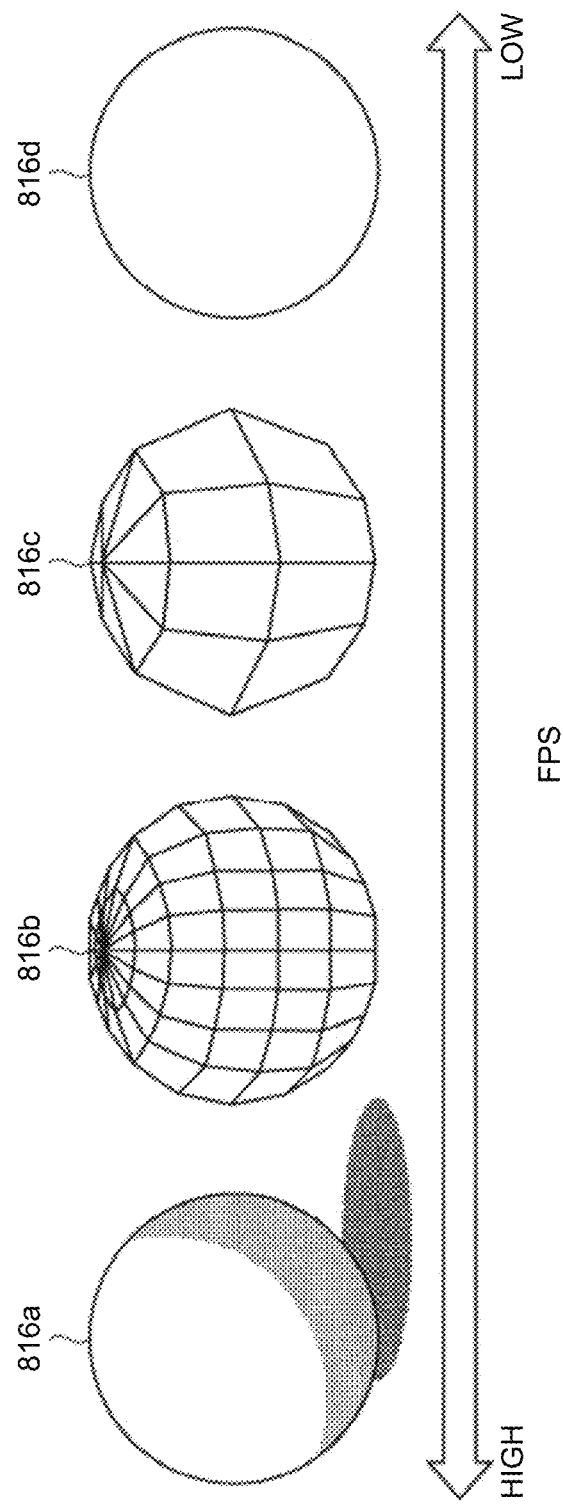
FIG. 16 is an explanatory diagram for describing exemplary processing according to Modification 2 of the present embodiment.

In Modification 2, as the effect processing on the virtual object having a spherical shape, the display format is dynamically changed from three-dimensional display to frame wire display and two-dimensional display in accordance with the FPS. Details of the present modification will be described below with reference to FIG. 16. FIG. 16 is an explanatory diagram for describing exemplary processing according to Modification 2.

Specifically, when the FPS is high as illustrated on the left side in FIG. 16, the FPS means that the processing capacity of the information processing device 1 has allowance, and thus a virtual object 816a is, for example, three-dimensionally displayed as if it is a real object existing in real space.

When the FPS is intermediate as illustrated at the center in FIG. 16, the processing capacity of the information processing device 1 has some allowance, and thus a virtual object 816b is displayed by, for example, wire frame display. The virtual object 816b has a polygonal shape approximate to a spherical shape and a large number of apexes due to wire frames, and thus is displayed as if it is a stereoscopic object although the quality of appearance is lower than that of the virtual object 816a. With the wire frame display, the amount of display processing (load) can be reduced as compared to the above-described three-dimensional display. Thus, in the present modification, the virtual object is displayed by using the wire frame display with a smaller load when the processing capacity of the information processing device 1 has some allowance.

When the FPS is further lower, the processing capacity of the information processing device 1 is losing allowance, and thus a virtual object 816c having a spherical shape is displayed in a polygonal shape having a smaller number of apexes due to wire frames than that of the virtual object 816b. With the display in a polygonal shape with a smaller number of apexes in this manner, the amount of display processing (load) can be further reduced. Thus, in the present modification, the state of wire frame display is changed, and specifically, the virtual object is displayed in a polygonal shape having a smaller number of apexes with a smaller load when the processing capacity of the information processing device 1 is losing allowance.

In addition, when the FPS is extremely low as illustrated on the right side in FIG. 16, the processing capacity of the information processing device 1 has no allowance, and thus a virtual object 816d is two-dimensionally displayed. With the two-dimensional display of the virtual object in this manner, the amount of display processing (load) can be reduced as compared to the three-dimensional display and the like. When the two-dimensional display is used, the quality of appearance of the virtual object 816d is lower than the virtual object 816c. However, in the present modification, the amount (load) of processing at the information processing device 1 is reduced by the two-dimensional display even when the processing capacity of the information processing device 1 has no allowance, thereby avoiding display frame rate decrease.

In the embodiments and modifications of the present disclosure, examples of other display detail levels of the virtual object to be changed include not only the above-described shading processing and the like but also texture (touch feeling of the virtual object), the display concentration, transparency, luminance, and the like of the virtual object.

Modification 3

Figure 17:
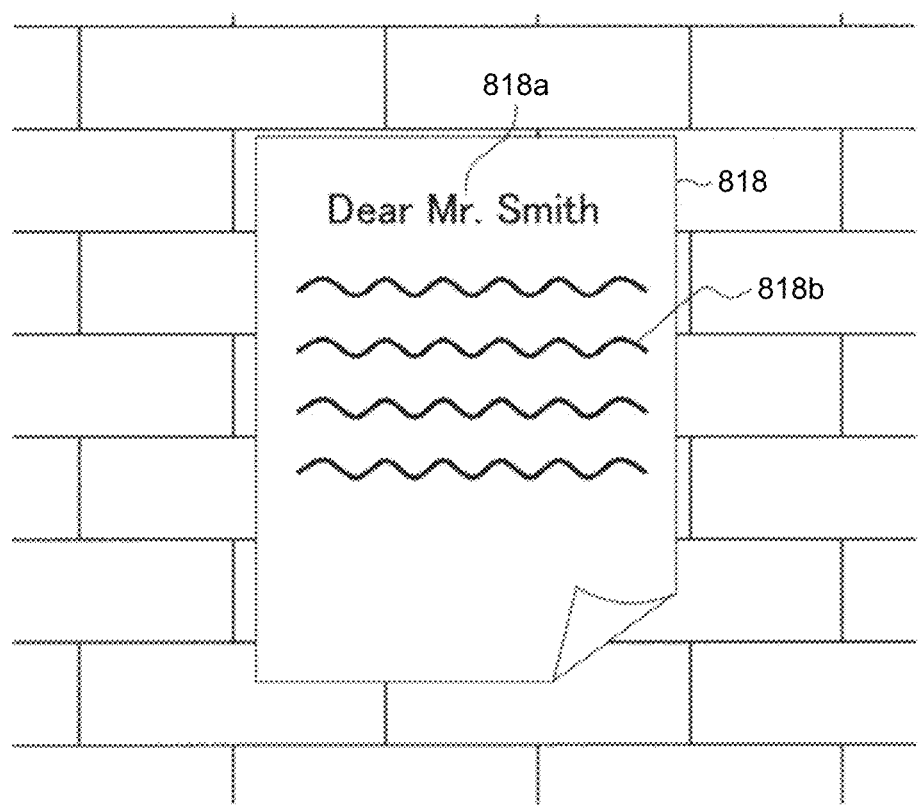
FIG. 17 is an explanatory diagram for describing exemplary processing according to Modification 3 of the present embodiment.

In the above-described embodiments and modifications of the present disclosure, the display detail level of the virtual object is dynamically changed in accordance with the processing amount of display of the virtual object and the processing state. In addition, in the embodiments and modifications, the display detail level of the virtual object may be dynamically changed with the state of the user 700 taken into consideration. Thus, the following describes, as one of such modifications, Modification 3 in which the display resolution of the virtual object is changed in accordance with the direction of the sight line of the user 700 with reference to FIG. 17. FIG. 17 is an explanatory diagram for describing exemplary processing according to Modification 3.

The following discusses a case in which the display resolution of the virtual object is reduced in accordance with the processing amount of display of the virtual object and the processing state in the embodiments and the like described above. For example, when a displayed virtual object 818 is a character content such as a letter as illustrated in FIG. 17 and display is made at a reduced display resolution, characters in the virtual object 818 cannot be recognized by the user 700 in some cases. However, when the display resolution is increased because characters cannot be recognized in this manner, the amount of display processing increases and the processing capacity of the information processing device 1 has no allowance, thereby causing display frame rate decrease. Thus, in the present modification, instead of increasing the entire display resolution of the virtual object 818, the direction of the sight line of the user 700 is sensed and the display resolution is increased only in parts of the virtual object 818 positioned ahead in the sight line. In other words, in the present modification, when it is determined that the user 700 is gazing at the virtual object (second the virtual object) such as a character content for which a relatively high identification request level is required, the control unit 10 increases the display resolution (display detail level) of the virtual object as compared to a case in which it is determined that the user 700 is gazing at another virtual object (first virtual object) (for example, a virtual object such as a figure for which a high identification request level is not required). In this manner, according to the present modification, the display quality at which information presented through the virtual object 818 can be easily perceived by the user 700 can be maintained while the amount of display processing is reduced to avoid display frame rate decrease. In the present modification, a virtual object having a relatively high identification request level is not limited to a character content but may be optionally set.

Specifically, the information processing device 1 senses the direction of the sight line of the user 700 by using, for example, an image captured by the inward camera 122. Then, the information processing device 1 sets the display resolution of a part 818*a* of the virtual object 818 displayed at a low display resolution, which is positioned ahead in the sight line of the user 700, to be high based on a result of the sensing. More specifically, when it is sensed that the part 818*a* of the virtual object 818 is positioned ahead in the sight line of the user 700, the display resolution in the part 818*a* is increased to allow recognition of characters (in the example illustrated in FIG. 17, "Dear Mr. Smith") in the part 818*a*. The display resolution is lower in another part 818*b* of the virtual object 818, which is not positioned ahead in the sight line of the user 700 than in the part 818*a*. Thus, the user 700 can perceive that characters are displayed in the part 818*b* but cannot specifically recognize the characters.

In this manner, in the present modification, the part 818*a* of the virtual object 818, which is desired to be viewed by the user 700 is clearly displayed, and the other part 818*b* of the virtual object 818, which is not desired to be viewed by the user 700 is unclearly displayed. Thus, according to the present modification, the display quality at which information presented through the virtual object 818 can be easily perceived by the user 700 can be maintained while the amount of display processing is reduced to avoid display frame rate decrease.

In the present modification, when the direction of the sight line of the user 700 is moved to the part 818*b*, the information processing device 1 reduces the display resolution of the part 818*a* and increases the display resolution of the part 818*b*. In the present modification, when a plurality of virtual objects are simultaneously displayed, the display resolution of each virtual object may be changed in accordance with the direction of the sight line of the user 700.

The present modification is not limited to the case in which the display resolution of the virtual object is changed in accordance with the direction of the sight line of the user 700, but the display resolution of the virtual object may be changed in accordance with, for example, the direction toward which the hand 702 of the user 700 is moved. Specifically, when a plurality of virtual objects are simultaneously displayed, a virtual object toward which the hand of the user 700 is moved is displayed at a higher display resolution than any other virtual object. In this manner, in the present modification, the display detail level of each virtual object may be dynamically changed in accordance with the state of the user 700 in combination with the above-described embodiments and the like.

6. Conclusion

As described above, in the embodiments and modifications of the present disclosure, a state that causes decrease of the display frame rate (FPS) of the virtual object is sensed, and the display detail level of the virtual object is dynamically changed in accordance with a result of the sensing. In this manner, according to the present embodiments and the like, allowance can be ensured in the processing capacity of the information processing device 1, thereby avoiding the display frame rate decrease. In other words, according to the present embodiments and the like, the quality of the virtual object viewed from the user 700 can be excellently maintained while the display frame rate of the virtual object is excellently maintained. As a result, according to the present embodiment, real-time interaction between the user 700 and the information processing device 1 through the virtual object can be achieved, and beneficial experience can be provided to the user 700.

In addition, according to the present embodiments and the like, the amount of display processing at the information processing device 1 can be reduced by dynamically changing the display detail level of the virtual object, and accordingly, electric power consumption can be reduced. As a result, according to the present embodiments and the like, reduced battery capacity can be achieved to provide the information processing device 1 in a smaller size.

The above-described embodiments and modifications of the present disclosure may be performed in combination with each other. Although the above description is made on the exemplary application to smart eye glasses including a transmissive display, the embodiments of the present disclosure are not limited thereto but are applicable to, for example, an HMD including a non-transmissive display.

7. Hardware Configuration

Figure 18:
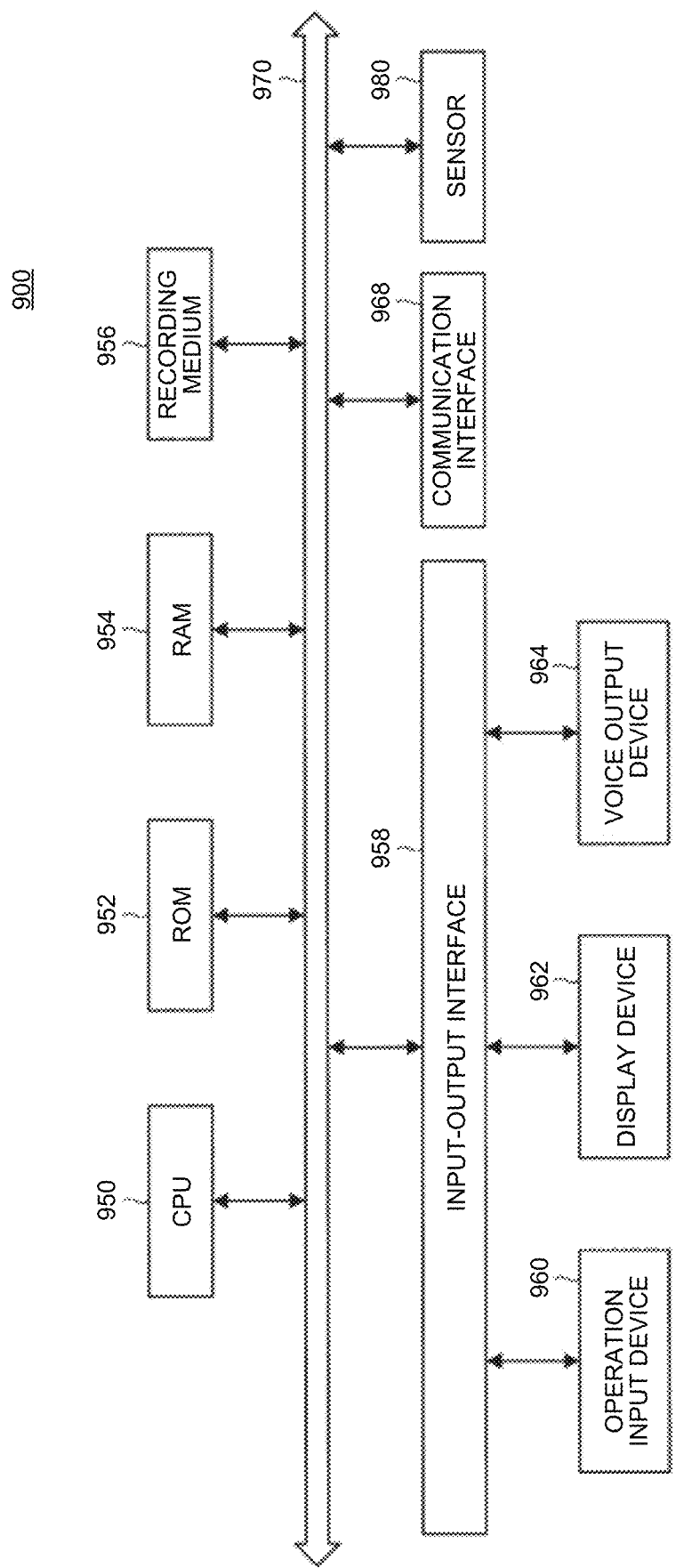
FIG. 18 is a block diagram illustrating an exemplary hardware configuration of an information processing device 900 according to an embodiment of the present disclosure.

FIG. 18 is a block diagram illustrating an exemplary hardware configuration of an information processing device 900 according to an embodiment of the present disclosure. In FIG. 18, the information processing device 900 indicates an exemplary hardware configuration of the above-described information processing device 1.

The information processing device 900 includes, for example, a CPU 950, a ROM 952, a RAM 954, a recording medium 956, an input-output interface 958, and an operation input device 960. In addition, the information processing device 900 includes a display device 962, a voice output device 964, a communication interface 968, and a sensor 980. The components of the information processing device 900 are connected with each other through, for example, a bus 970 as a data transmission path.

CPU 950

The CPU 950 includes, for example, one or a plurality of processors including calculation circuits such as a CPU and a GPU, and various kinds of processing circuits, and functions as a control unit (for example, the above-described control unit 10) configured to control the entire information processing device 900. Specifically, the CPU 950 achieves, for example, the functions of the information acquisition unit 100, the display parameter calculation unit 102, the display format determination unit 104, and the output control unit 106 described above in the information processing device 900.

ROM 952 and RAM 954

The ROM 952 stores, for example, control data such as computer programs and calculation parameters used by the CPU 950. The RAM 954 temporarily stores, for example, computer programs executed by the CPU 950.

Recording Medium 956

The recording medium 956 functions as the above-described storage unit 14, and stores various kinds of data such as data related to the information processing method according to the present embodiment and various applications. Examples of the recording medium 956 include a magnetic recording medium such as a hard disk, and a non-transitory memory such as a flash memory. The recording medium 956 may be detachably provided to the information processing device 900.

Input-Output Interface 958, Operation Input Device 960, Display Device 962, and Voice Output Device 964

The input-output interface 958 connects, for example, the operation input device 960 and the display device 962. Examples of the input-output interface 958 include a universal serial bus (USB) terminal, a digital visual interface (DVI) terminal, a high-definition multimedia interface (HDMI) (registered trademark) terminal, and various kinds of processing circuits.

The operation input device 960 functions as, for example, the above-described operation input unit 22 and is connected with the input-output interface 958 inside the information processing device 900.

The display device 962 functions as, for example, the above-described display unit 16, and is included in the information processing device 900 and connected with the input-output interface 958 inside the information processing device 900. Examples of the display device 962 include a liquid crystal display and an organic electro-luminescence display (organic EL display).

The voice output device 964 functions as, for example, the above-described speaker 18, and is included in, for example, the information processing device 900 and connected with the input-output interface 958 inside the information processing device 900.

The input-output interface 958 may be connected with an external device such as an operation input device (for example, a keyboard or a mouse) outside the information processing device 900 or an external display device.

The input-output interface 958 may be connected with a drive (not illustrated). The drive is a reader-writer for a removable recording medium such as a magnetic disk, an optical disk, or a semiconductor memory, and is built in or externally connected with the information processing device 900. The drive reads information recorded in a removable recording medium attached thereto, and outputs the information to the RAM 954. The drive can write a record to a removable recording medium attached thereto.

Communication Interface 968

The communication interface 968 functions as the communication unit 20 for performing communication with another external device in a wireless or wired manner through, for example, a communication network (not illustrated) (or directly). Examples of the communication interface 968 include a communication antenna and a radio frequency (RF) circuit (wireless communication), an IEEE802.15.1 port and a transmission and reception circuit (wireless communication), an IEEE802.11 port and a transmission and reception circuit (wireless communication), and a local area network (LAN) terminal and a transmission and reception circuit (wired communication).

Sensor 980

The sensor 980 functions as the above-described sensor unit 12. In addition, the sensor 980 may further include various sensors such as an illuminance sensor.

The exemplary hardware configuration of the information processing device 900 is described above. However, the hardware configuration of the information processing device 900 is not limited to the configuration illustrated in FIG. 18. Specifically, each above-described component may be achieved by a general-purpose member or hardware specialized for the function of the component. Such a configuration may be changed as appropriate in accordance with a technology level when the present disclosure is performed.

For example, the information processing device 900 may not include the communication interface 968 when performing communication with an external device or the like through an external communication device connected thereto or performs processing in a stand-alone manner. The communication interface 968 may have a configuration in which communication with one or a plurality of external devices can be performed by a plurality of communication schemes. The information processing device 900 may not include, for example, the recording medium 956, the operation input device 960, and the like.

The information processing device 900 according to the present embodiment may be applied to a system, such as cloud computing, including a plurality of devices based on the assumption of having network connection (or communication among devices). Thus, the information processing device 900 according to the present embodiment described above may be achieved as, for example, an information processing system configured to perform processing of the information processing method according to the present embodiment by a plurality of devices.

8. Supplement

The above-described embodiments may include, for example, a computer program for causing a computer to function as an information processing device according to the present embodiment, and a non-temporary physical medium in which the computer program is recorded. The above-described computer program may be distributed through a communication line (including wireless communication) such as the Internet.

In addition, the steps in processing of each above-described embodiment do not necessarily need to be processed in the written order. For example, the steps may be processed in a different order as appropriate. The steps may be processed partially in parallel or individually instead of being processed in a temporally sequential manner. In addition, each step does not necessarily need to be processed by the written method, but may be processed, for example, by another method by another functional block.

The preferable embodiments of the present disclosure are described above in detail with reference to the accompanying drawings, but the technical scope of the present disclosure is not limited to such examples. Various changes and modifications could be thought of by any person having typical knowledge in the technical field of the present disclosure within the range of the technical idea recited in the claims, and it should be understood that these changes and modifications belong to the technical scope of the present disclosure.

Effects described in the present specification are merely explanatory or exemplary but not restrictive. Thus, the technology according to the present disclosure achieves, together with or in place of the above-described effects, any other effect that is clear to the skilled person in the art from description of the present specification.

Configurations as described below belong to the technical scope of the present disclosure.

(1) An information processing device comprising a control unit configured to sense a state that causes decrease of a display frame rate of a virtual object presented to a user and dynamically change a display detail level of the virtual object in accordance with a result of the sensing.

(2) The information processing device according to (1), wherein the control unit dynamically changes the display detail level of the virtual object in accordance with a sensed amount of display processing of the virtual object.

(3) The information processing device according to (2), wherein the control unit changes the display detail level of the virtual object in accordance with a display distance from the user to a display position of the virtual object.

(4) The information processing device according to (3), wherein, when the display distance is equal to a first distance, the control unit increases the display detail level as compared to a case in which the display distance is equal to a second distance shorter than the first distance.

(5) The information processing device according to (4), wherein, when the display distance is equal to the first distance, the control unit increases display area of the virtual object as compared to a case in which the display distance is equal to the second distance.

(6) The information processing device according to (2), further comprising a display unit configured to display the virtual object, wherein
the control unit changes the display detail level of the virtual object in accordance with the ratio of display area of the virtual object relative to display area of the display unit.

(7) The information processing device according to (2), wherein the control unit changes the display detail level of the virtual object in accordance with the number of the virtual objects displayed.

(8) The information processing device according to (2), wherein the control unit changes the display detail level of the virtual object in accordance with the type of the virtual object.

(9) The information processing device according to (1), wherein the control unit dynamically changes the display detail level of the virtual object in accordance with a sensed state of processing at the control unit.

(10) The information processing device according to (9), wherein the control unit changes the display detail level of the virtual object in accordance with the display frame rate of the virtual object.

(11) The information processing device according to (9), wherein the control unit changes the display detail level of the virtual object in accordance with a recognition frame rate at which the state of the user or surroundings of the user is recognized.

(12) The information processing device according to (11), wherein the control unit distributes processing capacity of the control unit into at least processing of display of the virtual object and processing of the recognition, and changes the display detail level of the virtual object in accordance with the processing capacity distributed to the processing of the recognition.

(13) The information processing device according to any one of (9) to (11), wherein the control unit dynamically changes the display detail level of the virtual object in accordance with a sensed state of the user.

(14) The information processing device according to (13), wherein
the virtual object includes a first virtual object and a second virtual object having an identification request level higher than an identification request level of the first virtual object, and
when having determined that the user is gazing at the second virtual object, the control unit increases the display detail level of the second virtual object as compared to a case in which the control unit has determined that the user is gazing at the first virtual object.

(15) The information processing device according to (1), wherein the control unit changes at least one of a display resolution of the virtual object and effect processing on the virtual object.

(16) The information processing device according to (15), wherein the control unit performs, as the effect processing, at least one of change of shading processing on the virtual object, change of the state of wire frame display of the virtual object, change between two-dimensional display and three-dimensional display of the virtual object, and change of transparency of the virtual object.

(17) The information processing device according to (1), wherein
the information processing device is a wearable device mounted on the head of the user, and
the information processing device further includes a display unit positioned in front of the eyes of the user when mounted.

(18) The information processing device according to (17), wherein
the display unit is a transmissive display, and
the display unit displays the virtual object in a superimposing manner over real space.

(19) An information processing method comprising sensing a state that causes decrease of a display frame rate of a virtual object presented to a user, and dynamically changing a display detail level of the virtual object in accordance with a result of the sensing.

(20) A computer program configured to cause a computer to function as a control unit configured to sense a state that causes decrease of a display frame rate of a virtual object presented to a user and dynamically change a display detail level of the virtual object in accordance with a result of the sensing.

REFERENCE SIGNS LIST 1, 900 information processing device
10 control unit
12 sensor unit
14 storage unit
16, 16A, 16B display unit
18 speaker
20 communication unit
22 operation input unit
100 information acquisition unit
102 display parameter calculation unit
104 display format determination unit
106 output control unit
120 outward camera
122 inward camera
124 microphone
126 gyro sensor
128 acceleration sensor
130 azimuth sensor
132 position measurement unit
134 biosensor
600 marker
602 wall surface
604 automobile
700 user
702 hand
800, 802a to 802c, 804a and 804b, 806a to 806c, 808a to 808c, 810, 812a to 812c, 814a to 814c, 816a to 816d, 818 virtual object
818a, 818b part
950 CPU
952 ROM
954 RAM
956 recording medium
958 input-output interface
960 operation input device
962 display device
964 voice output device
968 communication interface
970 bus
980 sensor

The invention claimed is:

1. An information processing device, comprising:
a control unit configured to:
sense a state that causes decrease of a display frame rate of a virtual object presented to a user; and
dynamically change, upon the sense of the state, a display detail level of the virtual object based on a display distance from the user to a display position of the virtual object,
wherein, based on the display distance equal to a first distance, the display detail level is increased as compared to a case in which the display distance is equal to a second distance shorter than the first distance.

2. The information processing device according to claim 1, wherein the control unit is further configured to dynamically change the display detail level of the virtual object based on a sensed amount of display processing operation of the virtual object.

3. The information processing device according to claim 1, wherein, based on the display distance equal to the first distance, the control unit is further configured to increase a display area of the virtual object as compared to a case in which the display distance is equal to the second distance.

4. The information processing device according to claim 1, further comprising a display unit configured to display the virtual object, wherein
the control unit is further configured to change the display detail level of the virtual object based on a ratio of a display area of the virtual object with respect to a display area of the display unit.

5. The information processing device according to claim 1, wherein the control unit is further configured to change the display detail level of the virtual object based on a number of the virtual objects displayed to the user.

6. The information processing device according to claim 1, wherein the control unit is further configured to change the display detail level of the virtual object based on a type of the virtual object.

7. The information processing device according to claim 1, wherein the control unit is further configured to dynamically change the display detail level of the virtual object based on a sensed state of a processing operation at the control unit.

8. The information processing device according to claim 7, wherein the control unit is further configured to change the display detail level of the virtual object based on the display frame rate of the virtual object.

9. The information processing device according to claim 7, wherein the control unit is further configured to change the display detail level of the virtual object based on a recognition frame rate at which a state of at least one of the user or a surrounding of the user is recognized by the control unit.

10. The information processing device according to claim 9, wherein the control unit is further configured to:
distribute processing capacity of the control unit into at least one of a display processing operation for display of the virtual object or a recognition processing operation for the recognition frame rate, and
change the display detail level of the virtual object based on the processing capacity distributed to the recognition processing operation.

11. The information processing device according to claim 7, wherein the control unit is further configured to dynamically change the display detail level of the virtual object based on a sensed state of the user.

12. The information processing device according to claim 11, wherein the virtual object includes a first virtual object, and a second virtual object having an identification request level higher than an identification request level of the first virtual object, and the control unit is further configured to, upon determination of a gaze of the user at the second virtual object, increase the display detail level of the second virtual object as compared to a case in which the gaze of the user is at the first virtual object.

13. The information processing device according to claim 1, wherein the control unit is further configured to change at least one of a display resolution of the virtual object or a level of an effect processing operation on the virtual object.

14. The information processing device according to claim 13, wherein the effect processing operation comprises at least one of a change of a shading processing operation on the virtual object, a change of the state of a wire frame display of the virtual object, a change between a two-dimensional display and a three-dimensional display of the virtual object, or a change of transparency of the virtual object.

15. The information processing device according to claim 1, wherein
the information processing device is a wearable device mounted on a head of the user, and
the information processing device further includes a display unit positioned in front of the eyes of the user when the information processing device is mounted on the head of the user.

16. The information processing device according to claim 15, wherein
the display unit is a transmissive display, and
the display unit is configured to display the virtual object in a superimposing manner over real space.

17. An information processing method, comprising:
sensing a state that causes decrease of a display frame rate of a virtual object presented to a user; and
dynamically changing, upon the sensing of the state, a display detail level of the virtual object based on a display distance from the user to a display position of the virtual object,
wherein, based on the display distance equal to a first distance, the display detail level is increased as compared to a case in which the display distance is equal to a second distance shorter than the first distance.

18. A non-transitory computer-readable medium having stored thereon computer-executable instructions that, when executed by a processor, cause a computer to perform operations, comprising:
sensing a state that causes decrease of a display frame rate of a virtual object presented to a user; and
dynamically changing, upon the sensing of the state, a display detail level of the virtual object based on a display distance from the user to a display position of the virtual object,
wherein, based on the display distance equal to a first distance, the display detail level is increased as compared to a case in which the display distance is equal to a second distance shorter than the first distance.

19. The information processing device according to claim 9, wherein
the control unit is further configured to recognize the state of at least one of the user or the surrounding of the user based on at least one of a user-posture recognition operation, a real-space depth recognition operation, or a user-sight line recognition operation.

* * * * *